US012693210B1

(12) United States Patent
Park et al.

(10) Patent No.: US 12,693,210 B1
(45) Date of Patent: Jul. 28, 2026

(54) MEASUREMENT SYSTEM WITH DETECTION MECHANISM AND METHOD OF OPERATION THEREOF

(71) Applicant: Park Systems Corp., Suwon (KR)

(72) Inventors: HyunSik Park, Suwon (KR); Kyulee Kang, Suwon (KR); Yoonshik Kang, Seongnam (KR)

(73) Assignee: Park Systems Corp., Suwon (KR)

( * ) Notice: Subject to any disclaimer, the term of this patent is extended or adjusted under 35 U.S.C. 154(b) by 0 days.

(21) Appl. No.: 19/238,880

(22) Filed: Jun. 16, 2025

(51) Int. Cl.
*G01N 21/21* (2006.01)

(52) U.S. Cl.
CPC ..... *G01N 21/211* (2013.01); *G01N 2021/213* (2013.01)

(58) Field of Classification Search
CPC ........................ G01N 21/211; G01N 2021/213
USPC ......................................... 356/327
See application file for complete search history.

(56) References Cited

U.S. PATENT DOCUMENTS

| | | | |
|---|---|---|---|
| 7,061,613 B1 | 6/2006 | Huang et al. | |
| 7,064,828 B1 | 6/2006 | Rovira et al. | |
| 11,391,666 B1 | 7/2022 | Hovorka et al. | |
| 2004/0032581 A1* | 2/2004 | Nikoonahad | G01N 21/9501 |
| | | | 356/237.2 |
| 2016/0327779 A1* | 11/2016 | Hillman | G02B 21/0032 |

FOREIGN PATENT DOCUMENTS

| | | | | |
|---|---|---|---|---|
| TW | 201706593 A | * | 2/2017 | H04N 23/56 |

OTHER PUBLICATIONS

Workshop of Photronics, 2021; Custom Space Variant Retarders. Datasheet [online]. Mokslininku st. 6A, Vilnius, LT-08412, Lithuania, [retrieved on May 8, 2025]. Retrieved from the Internet: https://wophotonics.com/products/custom-space-variant-retarders.

Laser 2000, Liquid Crystal Variable Retarder. Datasheet [online]. Meadowlark Optics, 2024 [retrieved on May 8, 2025]. Retrieved from the Internet: https://photonics.laser2000.co.uk/products/light-delivery-and-control/polarisation-phase-control/liquid-crystal-devices-polarisation-phase-control/liquid-crystal-variable-rotator.

Aivaras Kazakevicius, Raimundas Burokas, Rokas Danilevicius, and Andrejus Michailovas; "Ultrafast 10 mJ, 100 W laser system featuring a directly laser written depolarization compensation element," pp. 15326 to 15335 Journal © 2024, Optics Express, vol. 32, No. 9/Apr. 22, 2024, Optica Publishing Group.

Shun Wen, Xinyuan Xue, Shuai Wang, Yibo Ni, Liqun Sun and Yuanmu Yang; "Metasurface array for single-shot spectroscopic ellipsometry," pp. 1 to 8; Light: Science & Applications (2024), vol. 13, No. 88, Apr. 10, 2024; https://doi.org/10.1038/s41377-024-01396-3.

* cited by examiner

*Primary Examiner* — Sunghee Y Gray
(74) *Attorney, Agent, or Firm* — Perspectives Law Group, Corp.

(57) ABSTRACT

A method of operation of a measurement system includes: generating an encoded polarized light with a spatially-varying waveplate; generating an illumination line through a telecentric relay tilted under a condition; projecting the illumination line on a sample corresponding to a phase map carrying a different phase delay based on the encoded polarized light; and forming a line image of the illumination line with a linear detector array for testing the sample based on the line image.

20 Claims, 9 Drawing Sheets

116

About the sample space
Phase delay
(Lens DOF level)

Line Scan Image

Phase delay : 0 – 2 π

114    406

1100

GENERATING ENCODED POLARIZED
LIGHT 1102

GENERATING ILLUMINATION LINE
1104

PROJECTING ILLUMINATION LINE
1106

FORMING LINE IMAGE
1108

MEASUREMENT SYSTEM WITH DETECTION MECHANISM AND METHOD OF OPERATION THEREOF

TECHNICAL FIELD

An embodiment of the present invention relates generally to a measurement system, and more particularly to a system with a detection mechanism.

BACKGROUND

In modern science and industry, optical measurement technologies provide data for assessing the physical and functional characteristics of materials and devices. As fabrication processes advance and performance tolerances tighten, measurement systems are expected to deliver increasingly precise, rapid, and comprehensive evaluations across diverse applications.

Thus, a need still remains for a measurement system with detection mechanisms that capture critical information swiftly while maintaining fidelity and versatility. In view of the ever-increasing commercial competitive pressures, along with growing manufacturing needs, manufacturing expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a measurement system including: generating an encoded polarized light with a spatially-varying waveplate; generating an illumination line through a telecentric relay tilted under a condition; projecting the illumination line on a sample corresponding to a phase map carrying a different phase delay based on the encoded polarized light; and forming a line image of the illumination line with a linear detector array for testing the sample based on the line image.

An embodiment of the present invention provides a measurement system including: a spatially-varying waveplate configured to generate an encoded polarized light; a telecentric relay, coupled to the spatially-varying waveplate, tilted under a condition and configured to generate an illumination line and project the illumination line on a sample corresponding to a phase map carrying a different phase delay based on the encoded polarized light; and a linear detector array, coupled to the telecentric relay, configured to form a line image of the illumination line for testing the sample based on the line image.

An embodiment of the present invention provides a non-transitory computer-readable medium storing an instruction that, when executed by a control circuit of a measurement system, causes the control circuit to perform functions including: generating an encoded polarized light with a spatially-varying waveplate; generating an illumination line through a telecentric relay tilted under a condition; projecting the illumination line on a sample corresponding to a phase map carrying a different phase delay based on the encoded polarized light; and forming a line image of the illumination line with a linear detector array for testing the sample based on the line image.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
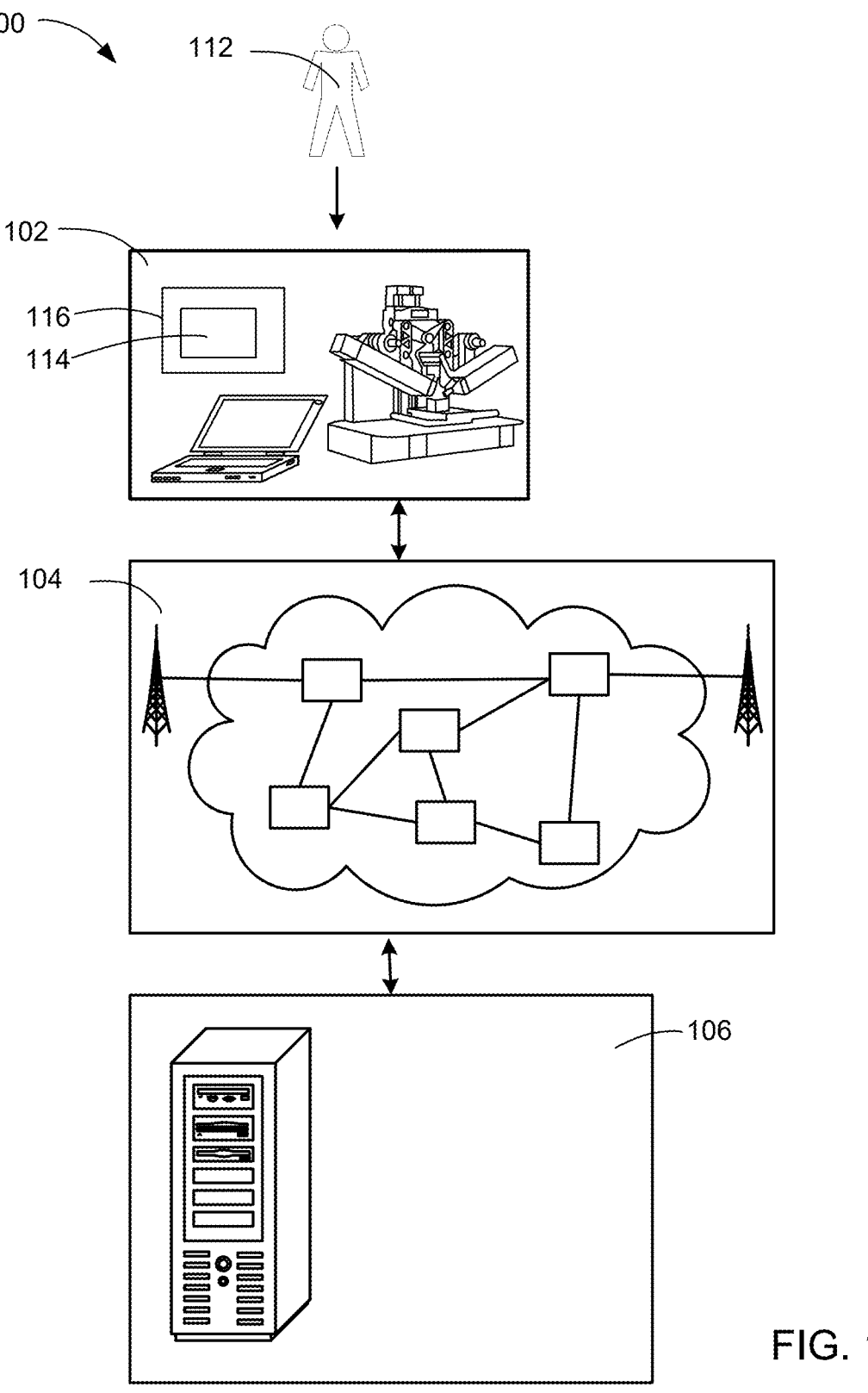
FIG. 1 is an example of a system architectural diagram of a measurement system with a detection mechanism of the present invention.

Description of various embodiments of the present invention is described with an example of development of an image spectroscopic ellipsometry (ISE) using a spatially-varying waveplate (SVWP).

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

For example, the hardware can include light sources, polarizers, spatially-varying waveplates, optical lenses, linear detector arrays, cameras, monochromators, collimators, telecentric relays, optical relays, 4-f relays, and other components of spectroscopic ellipsometry, as examples. As a specific example, the light sources can include laser-driven plasma light source (LDLS), supercontinuum fiber laser, deuterium+tungsten-halogen dual-lamp assembly, or any other light sources examples.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architectural diagram of a measurement system 100 with a detection mechanism 116 in an embodiment of the present invention. One or more embodiments address measurement functions of the measurement system 100 as a distributed platform in which exchanges of commands and data with a detection-mechanism across a network topology.

The measurement system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a measurement equipment, a computer, a notebook computer, or other multi-functional device. Also, for example, the first device 102 can be included in a device or a sub-system. As a specific example, the first device can be a spectroscopic-ellipsometer (SE), an imaging-spectroscopic-ellipsometer (ISE), or any other ellipsometry instruments or systems.

For example, the first device 102 can collect ISE data for a line scan across a sample and perform analysis to measure parametric information from the sample, including layer thickness, density, dispersion, uniformity, as example parameters. As another example, the first device 102 can collect ISE data for a line scan across a sample and transfer the ISE data to the second device 106 for compilation and analysis to measure the parametric information from the sample. For another example, the second device 106 can perform analysis of the scanned data utilizing artificial intelligence (AI) models, machine learning models, or other statistical models.

For example, the user 112 supplies a sample to the first device 102 with the detection mechanism 116, and the first device 102 captures and processes the optical data. The detection mechanism 116 is an operation of generating an optical light to project onto a sample, collecting information associated with light reflected from the sample, and performing an analysis of the collected information to determine parametric information of the sample. As another example, the first device 102 can perform all ellipsometric computations locally or, via the network 104, off-load part of the computation workload or share the local computation results with the second device 106 with a higher processing capacity.

For illustrative purposes, the sample 114 is shown in the detection mechanism 116, although it is understood that the sample 114 can be outside of the detection mechanism 116. For example, the sample 114 can be outside of the first device 102 and provided to the first device 102 to be tested.

For illustrative purposes, the detection mechanism 116 is shown in the first device 102, although it is understood that the detection mechanism 116 can be implemented in a different manner. For example, the detection mechanism 116 can be distributed between the first device 102 and the second device 106. Also for example, the first device 102 can include multiple devices that collect information associated with light reflected from multiple samples 114, and the collected information for all of the samples 114 can be transferred to the second device 106 to analyze to determine parametric information of the samples 114.

The first device 102 can couple, either directly or indirectly, to the network 104 to communicate with the second device 106 or can be a stand-alone device. The first device 102 can further be separated from or incorporated with a smart phone, a tablet computer, a laptop computer, a scanner, or other personal electronic devices.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

Also, for illustrative purposes, the measurement system 100 is described with the second device 106 as a computing device, although it is understood that the second device 106 can be different types of devices. Also, for illustrative purposes, the measurement system 100 is shown with the second device 106 and the first device 102 as endpoints of the network 104, although it is understood that the measurement system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, a user 112 can utilize the first device 102 to initiate or supervise a measurement sequence of a sample 114, while the second device 106 can receive sensed measurement information, execute analytical routines, and return processed measurement information to the user 112. As an example, the user 112 can be an operator, a laboratory technician, or any other users of the measurement system 100. Also as an example, the second device 106 can be implemented as centralized or decentralized computing resources. This partition of control and computation can allow measurements to be made while a data processing engine is located remotely, providing flexibility in deployment while maintaining quality results.

For example, the second device 106 can include the detection mechanism 116 for executing the analytical routines using the sensed measurement information. As an example, the detection mechanism 116 can process sensed information of a modulated light, record line-by-line intensity/phase information, and generate a pixel stream for downstream ellipsometric reconstruction. Further details for operations, components, and technical aspects of the detection mechanism 116 will be described below in the description of the measurement system 100.

Figure 2:
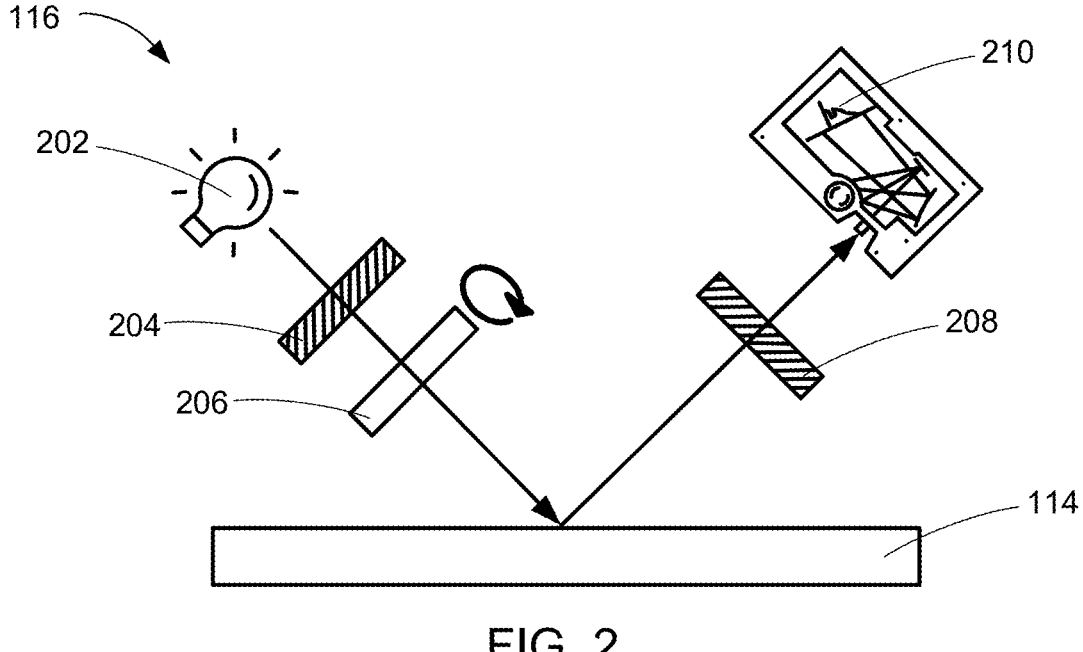
FIG. 2 is a first example of a configuration of components in the detection mechanism operating within the measurement system.

Referring now to FIG. 2, therein is shown a first example of a configuration of components in the detection mechanism 116 operating within the measurement system 100 of FIG. 1. The first example is a configuration for an embodiment to be discussed later. As clarification and for ease of description, the overall architecture is called the detection mechanism 116 although it is understood that the name is not intended to be limiting. For example, the detection mechanism 116 can include one or more artificial intelligence (AI) model or machine learning model and the models can include different approaches. Also for example, the detection mechanism 116 can include other functions implement in software that is not considered artificial intelligence or machine learning. Also for example, the AI model or machine learning model can be in software elsewhere within the measurement system 100 outside of the detection mechanism 116.

As an example embodiment, FIG. 2 depicts a flow for the detection mechanism 116 to include ellipsometry. For example, ellipsometry is an optical technique that acquires sample information by measuring the intensity ratio and phase difference of polarized light reflected (or transmitted) from the sample 114. In an illustrated embodiment, the detection mechanism 116 can include a light source 202, an incident polarizer 204, a phase compensator 206, a reflection polarizer 208, and a spectroscope 210.

As an example, the light source 202 can generate an illumination beam that can be linearly polarized by the incident polarizer 204 to establish a known polarization state. By way of an example, the incident polarizer 204 is an optical element that transmits electromagnetic waves having one state of polarization along a polarization axis while attenuating or blocking the orthogonal polarization components. As a specific example, the incident polarizer 204 can be a glan-taylor calcite prism, a wire-grid polarizer on fused-silica substrate, or any other broadband linear-polarizing element whose transmission axis can be aligned with the desired input state (e.g., polymer sheet polarizer, thin-film polarizer, brewster-angle plate), as examples.

For example, the illumination beam generated by the light source 202 can initially be unpolarized or partially polarized. In this example, when the illumination beam enters the incident polarizer 204, the incident polarizer 204 can selectively transmit an electric field component aligned with the transmission axis of the incident polarizer 204, while absorbing or reflecting orthogonal components. As a result, the output from the incident polarizer 204 can become a linearly polarized beam, with an electric field oscillating in a single, defined direction. For example, the incident polarizer 204 can be implemented as a wire-grid polarizer, Glan-Taylor prism, thin-film polarizing filter, or any other filters.

Continuing with the example, the known polarization state can refer to the orientation and amplitude of the electric field vector in the linearly polarized light exiting the incident polarizer 204. For example, the known polarization state can be set to p-polarization (parallel to the plane of incidence) or s-polarization (perpendicular to the plane of incidence), or at a specific angle depending on the measurement configuration. The known polarization state can be beneficial because ellipsometry quantifies how the sample 114 can modify this known polarization state upon reflection or transmission, allowing extraction of the intensity ratio and phase shift between the s- and p-polarized components.

As an example, the linearly polarized beam from the incident polarizer 204 can enter the phase compensator 206, which can introduce an optical retardance to serve as a reference for polarization analysis. For example, an optical retardance is a delay that the phase compensator 206 adds to one polarization component of light compared with the perpendicular polarization component of the light, resulting in one component to lag behind the other component. The beam with the optical retardance from the phase compensator 206 can be directed or projected onto the sample 114, where interaction with a surface or layered structure of the sample 114 can alter a polarization state of the beam. A reflected (or transmitted) beam from the sample 114 can then enter the reflection polarizer 208.

By way of an example, the reflection polarizer 208 is an optical element that transmits electromagnetic waves having one state of polarization along a polarization axis while attenuating or blocking the orthogonal polarization components. As a specific example, the incident polarizer 204 can be a glan-taylor calcite prism, a wire-grid polarizer on fused-silica substrate, or any other broadband linear-polarizing element whose transmission axis can be aligned with the desired input state (e.g., polymer sheet polarizer, thin-film polarizer, brewster-angle plate), as examples.

As an example, a resulting beam from the reflection polarizer 208 can enter the spectroscope 210. By way of an example, the spectroscope 210 is a device that splits a light into its individual wavelength to analyze how a sample behaves at each wavelength. As a specific example, the spectroscope 210 can be a diffraction-grating spectrograph or a prism-based disperser.

For example, the example, the spectroscope 210 can perform spectroscopic ellipsometry to perform the polarization analysis by adding broadband spectral analysis, enabling refractive-index measurement versus thickness and wavelength. For example, this configuration allows the measurement system 100 to acquire full ellipsometric data across the spectral range.

As an example, semiconductor fabs can demand very specific measurement areas in a scale of micrometers as examples, the detection mechanism 116 can focus light into a spot or location of micrometers on the sample 114, to support high-resolution measurements consistent with advanced fabrication requirements. For example, the detection mechanism 116 can focus light into a spot of approximately 30 μm or any other scales that semiconductor fabs demand.

For example, the incident polarizer 204, the reflection polarizer 208, or a combination thereof can be optically the same type of polarizers but can be implemented differently or be of different types. Also for example, the incident polarizer 204, the reflection polarizer 208, or a combination thereof can include different functions or operations. As a specific example, the incident polarizer 204 can define the polarization state of the illumination light or beam, remove any residual polarization, or a combination thereof while the reflection polarizer 208 can perform an inner product operation to measure the polarization state, the phase, or a combination thereof of the light or beam reflected from the sample 114.

For example, the orientation of the incident polarizer 204, the reflection polarizer 208, or a combination thereof can block a specific polarization. By way of an example, a 90 degree shift can block the primary polarization, pass the phase shifted response from the sample 114, or a combination thereof. It has been unexpectedly found that the function of the polarizer pair as a filter system can be useful to limit the analysis to only the phase shifted light from the sample 114 since the relative orientation can be optimized to identify specific characteristics of the sample 114.

Figure 3:
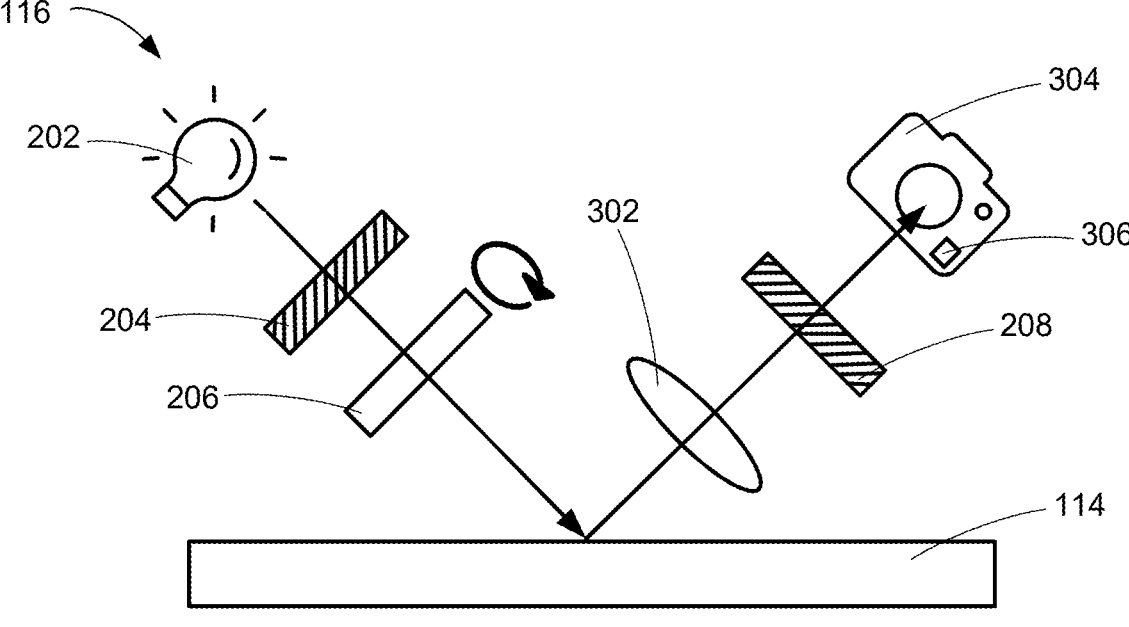
FIG. 3 is a second example of a configuration of components in the detection mechanism operating within the measurement system.

Referring now to FIG. 3, therein is shown a second example of a configuration of components in the detection mechanism 116 operating within the measurement system 100 of FIG. 1. The second example is a configuration for an embodiment to be discussed later. For example, the measurement system 100 can direct polarized, spectrally conditioned light onto a localized region of the sample 114 and capture a reflected signal from the sample 114 as an intensity distribution. Also for example, broadband ellipsometric data can be reconstructed across an illuminated area, with pixel-level precision enabling micron-scale feature measurement. In an illustrated configuration, the detection mechanism 116 can include the light source 202, the incident polarizer 204, the phase compensator 206, an imaging lens 302, the reflection polarizer 208, and a linear detector array 304 with a line image 306, all operating within the measurement system 100.

As an example embodiment, FIG. 3 depicts a flow for the detection mechanism 116 to include image spectroscopic ellipsometry (ISE). For example, ISE can be implemented to overcome limitations of spectroscopic ellipsometry (SE).

As an example, SE can scan a number of spots or locations on the sample 114 to cover a wide spectral band, but SE can have difficulty to meet a specific measurement-area specification. In a specific example, the measurement-area specification can include <5 μm or any other micron-scale. In contrast, ISE can capture ellipsometric images and support broadband measurement while meeting the specific measurement-area specification. For example, ISE can capture the ellipsometric images by utilizing the linear detector array 304 to meet the specific measurement-area specification as further described below.

As an example, the light source 202 can emit a broadband illumination, which can be spectrally conditioned by a monochromator to provide wavelength-resolved excitation. For example, the broadband illumination can refer to light that spans a wide range of wavelengths across a visible spectrum or extending into the ultraviolet and near-infrared. Unlike monochromatic light, which can contain a single wavelength, the broadband illumination can include multiple spectral components simultaneously. The broadband illumination can enable ellipsometry to evaluate, provide information to evaluate, or a combination thereof how optical properties can vary with wavelength in the sample 114.

Continuing the example, the emitted broadband illumination can be passed through the monochromator, which can selectively filter or disperse the light to isolate narrow spectral bands. The result can include the wavelength-resolved excitation, allowing the measurement system 100 to probe the sample 114. For example, the measurement system 100 can probe the sample 114 one wavelength at a time or in tunable bands, enabling high-resolution spectral analysis of refractive index, thickness, and other optical characteristics of the sample 114.

As an example, the broadband illumination as a conditioned light can be transmitted to the incident polarizer 204, which can convert the incoming conditioned light into a specific polarization state. The polarized beam with the specific polarization state from the incident polarizer 204 can then be directed to the phase compensator 206, which can introduce the optical retardance to serve as the reference for the subsequent polarization analysis. As an example, the beam with the optical retardance from phase compensator 206 can be directed or projected onto the sample 114, where interaction with a surface or layered structure of the sample 114 can alter the phase and polarization state of the beam depending on material properties and geometry of the sample 114.

As an example, the reflected (or transmitted) beam from the sample 114 can enter the imaging lens 302, which can collect and focus on the reflected beam. For example, the imaging lens 302 can collect the reflected beam as light that spreads out or diverges after reflection to gather the diverging beam within the numerical aperture of the imaging lens 302. The imaging lens 302 can then bend or refract the collected rays of the reflected beam so the collected rays converge to a sharp line focus, preserving the spatial correspondence between each point on the sample 114 and each pixel in the line image 306. In this way, the imaging lens 302 can collect and focus the reflected light for the subsequent polarization analysis.

As an example, the focused beam from the imaging lens 302 can then enter the reflection polarizer 208, which can analyze the polarization state of the focused beam after the interaction with the surface or layered structure of the sample 114. As an example, the reflection polarizer 208 can convert the altered polarization of the focused beam into brightness variations that the linear detector array 304 can then measure and record.

The linear detector array 304 can sample the intensity distribution across the beam received from the reflection polarizer 208 and convert the intensity distribution into electrical signals representing the spatial variation in polarization response. These signals can be used to form the line image 306, which represents the spatially and spectrally resolved ellipsometric data along the scan line. For example, the linear detector array 304 can include camera, line-scan camera, two-dimensional (2D) area camera, CMOS or CCD image sensors, focal plane arrays with spectroscopic filters, or any other image sensors.

Image Spectroscopic Ellipsometry (ISE) can be implemented in the configuration described above to support broadband measurement and can resolve micron-scale features through pixel-level resolution at high magnification. For example, the micron-scale features that can be resolved by ISE can include <5 μm or any other micron-scale features. This approach can overcome limitations of spectroscopic ellipsometry (SE) having difficulty to meet the specific measurement-area specification. However, ISE can involve a long acquisition time and a high shot noise due to limited photons per pixel.

Figure 4:
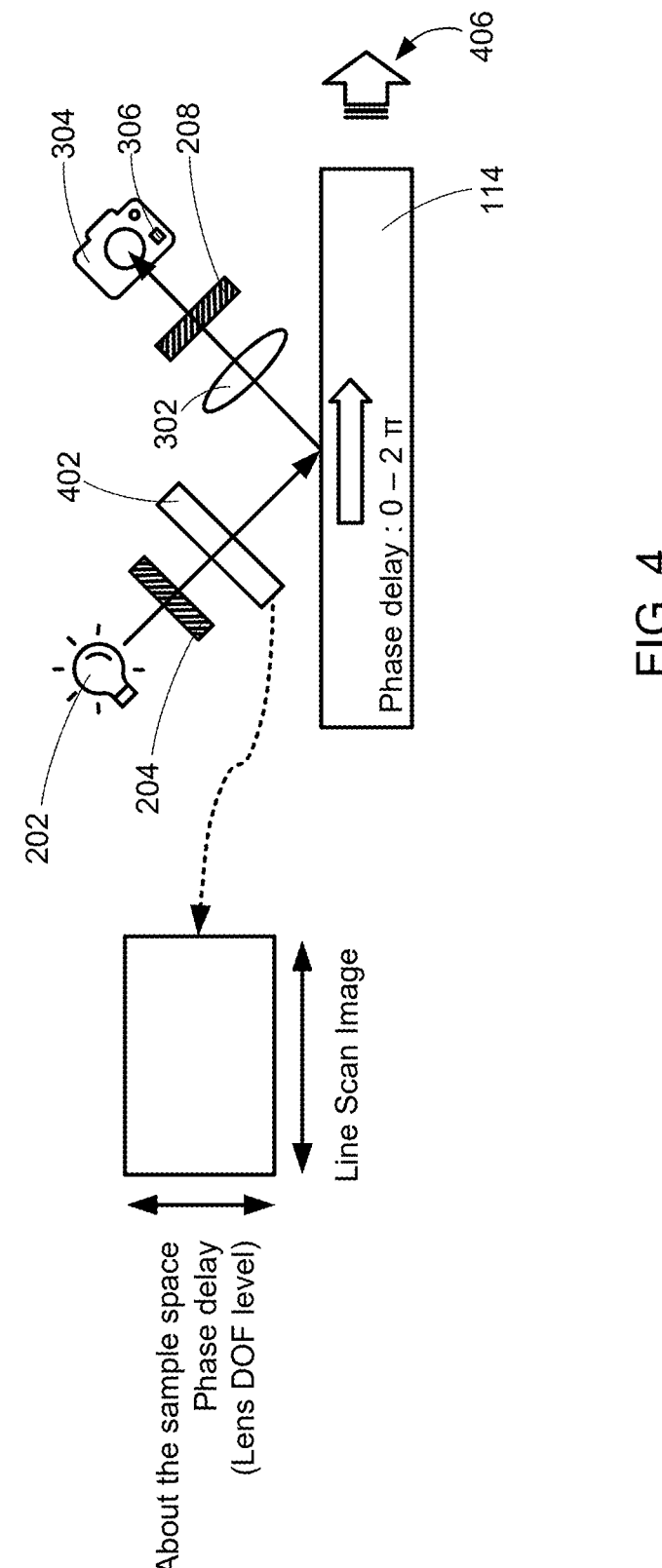
FIG. 4 is a first example of a flow overview of the detection mechanism operating within the measurement system in a first embodiment.

Referring now to FIG. 4, therein is shown a first example of a flow overview of the detection mechanism 116 operating within the measurement system 100 of FIG. 1 in a first embodiment. For example, the detection mechanism 116 can include operations that provide a broadband beam that can be polarized, encoded with a continuous (e.g., 0→2π) phase gradient along a scan axis, and directed or projected onto the sample 114. Further in this example, a reflected light from the sample 114 can be relayed, polarization of the reflected light can be converted into intensity, which can be sensed in one pass to furnish ellipsometric data without mechanical compensator stepping. By implementing a phase diversity spatially rather than temporally, the measurement system 100 can combine line-scan imaging with a phase modulator to achieve high-throughput measurement of micron-scale features. In an illustrated embodiment, the detection mechanism 116 can include the light source 202, the incident polarizer 204, a spatially-varying waveplate (SVWP) 402, the sample 114, an imaging lens 302, the reflection polarizer 208, the linear detector array 304, and the line image 306.

For example, the measurement system 100 can include an ISE configuration with spatially variable waveplate (SVWP). As an example, the measurement system 100 can include an ISE with an image for every compensator angle, but measurement can be slow. As another example, the measurement system 100 can include the detection mechanism 116 that combines operations of a line-scan imaging operation 406 with the spatially-varying waveplate (SVWP) 402. As a specific example, the spatially-varying waveplate 402 can apply a sequential phase delay along the line-scan direction corresponding to the line-scan imaging operation 406. It has been unexpectedly found that the combination is beneficial because the combination yields high-speed line-scan measurement while emulating waveplate rotation, thus providing the motivation for replacing mechanical compensator stepping with a static optic that embeds all phase states in one line exposure.

For example, implementations of the spatially-varying waveplate 402 can include liquid-crystal spatial light modulator (SLM) or nano-fabricated diffractive optical element (DOE), as examples. As an example, a liquid-crystal spatial light modulator (SLM) can include a liquid-crystal device that locally adjusts phase (or amplitude) so the waveplate's retardance pattern can be written electronically. As another example, a nano-fabricated diffractive optical element (DOE) can include a micro-structured or nano-structured optic that shapes the phase of light through diffraction rather than refraction, enabling the SVWP's built-in retardance pattern to be permanently etched into a compact substrate. As a specific example, the spatially-varying waveplate 402 can be realized by a LCOS (liquid crystal on silicon)-type liquid crystal SLM or by a nano patterned DOE fabricated with a femtosecond laser.

For example, the light source 202 can emit broadband illumination that serves as input to the incident polarizer 204. An output of the broadband illumination can include a beam whose electric-field oscillates in a single, known direction, simplifying downstream analysis.

For example, the incident polarizer 204 can receive the broadband illumination from the light source 202 and can transmit a beam with only the electric-field component of the broadband illumination aligned with a transmission axis of the incident polarizer 204. It has been unexpectedly found that this action of transmitting a beam with only the electric-field component outputs a beam that is fully linearly polarized in a known orientation, establishing a reproducible starting state for the downstream SVWP and analysis optics. As an example, the incident polarizer 204 can include a wire-grid device that can pass the desired polarization component while rejecting the orthogonal one, thereby setting a reproducible launch condition.

As an example embodiment, the spatially-varying waveplate 402 can receive a polarized beam from the incident polarizer 204 and can impose a sequential phase delay (e.g., 0→2π) across a line-scan axis of the polarized beam. It has been unexpectedly found that this phase coding utilizing the sequential phase delay emulates the effect of rotating compensator angles in a single static optic, enabling high-speed line-scan measurement while emulating waveplate rotation.

In a specific example embodiment, the spatially-varying waveplate 402 can include an implementation utilizing the phase gradient can be produced either by a patterned liquid-crystal SLM or by a nano-fabricated diffractive optical element, allowing compact integration. For example, the phase gradient refers to how the spatially-varying waveplate 402 can impose a smoothly varying optical retardance utilizing the sequential phase delay ranging from 0 to 2π along the line-scan axis, so that each successive point across the line can experience a slightly different phase delay. In this way, it has been unexpectedly found that the phase gradient encodes the full sequence of compensator angles spatially rather than temporally, enabling every pixel in the scan line to carry a distinct, known phase state in a single exposure.

Also as an example, the sample 114 can reflect or transmit a phase-encoded beam so that material-dependent changes in amplitude and phase can become embedded in the phase-encoded beam. The reflected phase-encoded beam can then enter the imaging lens 302, which can collect a diverging line and can refocus the beam while preserving the one-to-one mapping between sample positions and detector pixels. For example, the diverging line is the elongated stripe of reflected light that spreads outward after leaving the sample 114, such that its rays fan out because the sample 114 and the spatially-varying waveplate 402 have shaped the beam into a narrow line rather than a point.

For example, the imaging lens 302 can intercept that spreading stripe, gather the fanned-out rays, and refocus the fanned-out rays into a sharp, proportionally scaled line image that preserves the pixel-to-sample correspondence needed for accurate line-scan metrology. It has been unexpectedly found that this action of refocusing the fanned-out rays maintains spatial resolution along the line scan direction of the line-scan imaging operation 406.

As an example, the reflection polarizer 208 can convert the altered polarization state of the focused beam from the imaging lens 302 into intensity variations by projecting the vector field onto a transmission axis of the reflection polarizer 208, producing a signal that the linear detector array 304 can directly measure. Also as an example, the linear detector array 304 can convert the signal as the incoming optical line from the reflection polarizer 208 into a sequence of electrical signals that represent intensity versus position.

Continuing with the example, the sequence of electrical signals can be streamed out by the linear detector array 304 as the line image 306, which can form the raw data cube for subsequent ellipsometric reconstruction. The raw data cube can include a three-dimensional set of numbers streamed from the linear detector array 304: one axis is positioned along the scanned line (e.g. the line scan direction of the line-scan imaging operation 406), the second axis is wavelength (or sequential monochromator setting), and the third axis is detected intensity. Together these dimensions can include every pixel-and-wavelength intensity value the measurement system 100 acquires.

Continuing with the example, the subsequent ellipsometric reconstruction can include routines or functions implemented in software, hardware, or a combination thereof to utilize the raw data cube for comparing intensities recorded at different phase states and wavelengths. This approach is to solve the ellipsometric parameters 'and A at each line position, and then convert those parameters into refractive index, thickness, or other optical properties of the sample 114.

For example, parameter Y' can represent the amplitude ratio between the p-polarized and s-polarized components of the reflected (or transmitted) light, while parameter A can represent the phase difference between those same components. Together, Y' and A can fully characterize how the sample 114 alters the polarization state and thus serve as the core observables from which refractive index, thickness, and related optical constants can be extracted.

It has been unexpectedly found that the combined effect of the spatially-varying waveplate 402 applying the sequential phase delay and the line-scan readout of the linear detector array 304 delivers ellipsometric parameters for every point along the line scan direction of the line-scan imaging operation 406 without any moving compensator (e.g. the phase compensator 206), thereby achieving the speed advantage for line-scan measurement while emulating waveplate rotation.

As an illustrated example, the box in FIG. 4 corresponding to the sample space phase delay (lens DOF level) and the arrow for the line scan image can illustrate how the spatially-varying waveplate 402 imposes a 0→2π spatial phase delay across the illumination stripe projected onto the sample 114. The sequential phase delay can map directly onto the line scan direction of the line-scan imaging operation 406 so that, inside this sample-space region, each incremental position along the scan receives a slightly different phase state or delay while remaining within the depth-of-field (DOF) of the imaging lens 302. It has been unexpectedly found that this arrangement enables simultaneous acquisition of every compensator angle in a single pass.

Also as an example, the sample space phase delay (lens DOF level) can enable the phase-encoded beam projected onto the sample 114 to remain well focused on the sample 114 throughout the entire 0→2π spatial phase delay range, ensuring that the reflected phase-encoded beam as the reflected polarization signatures from the sample 114 captured downstream truly represent local material behavior of the sample 114 rather than defocus artefacts.

Figure 5:
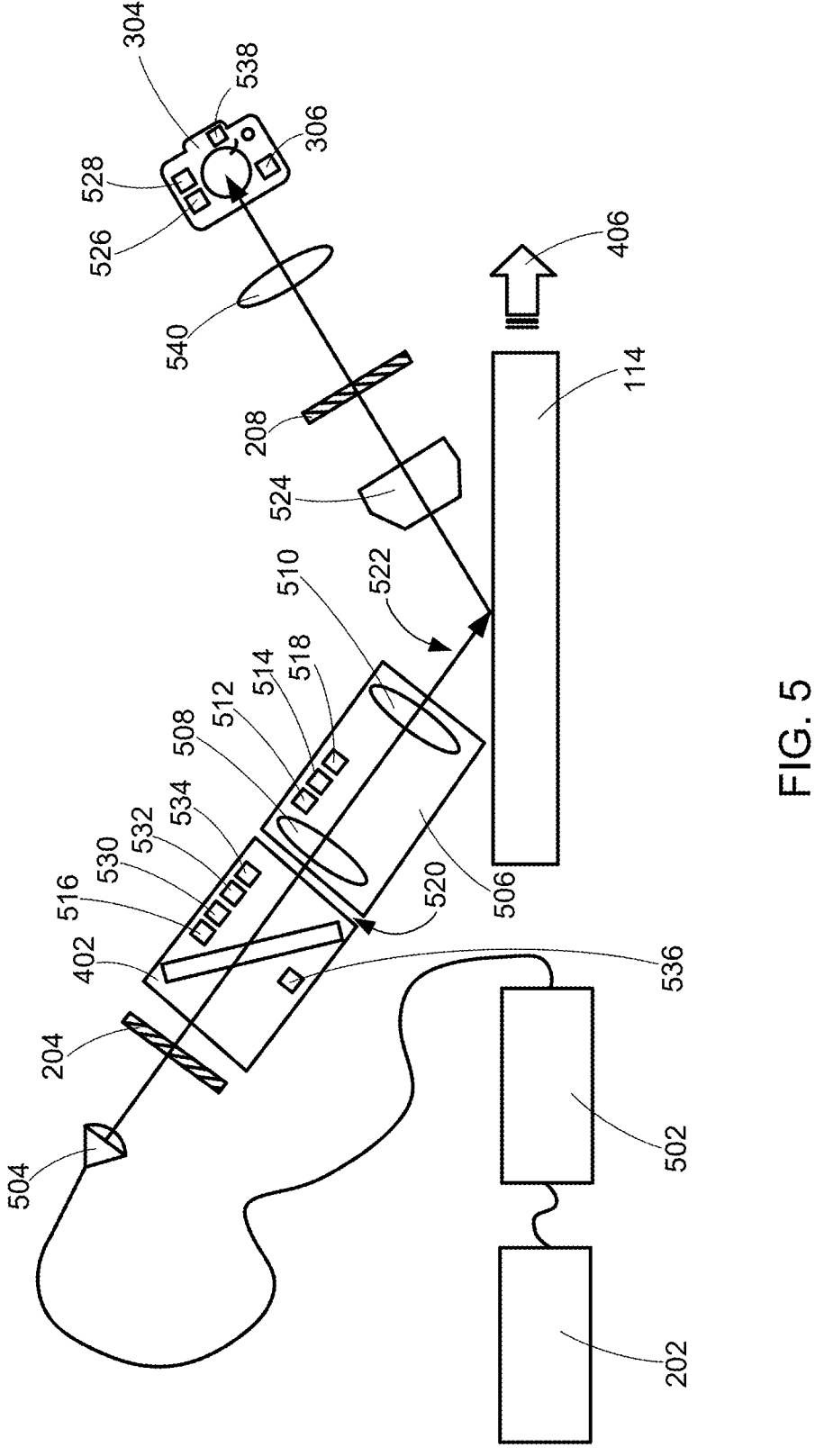
FIG. 5 is a second example of the flow overview of the detection mechanism operating within the measurement system in a second embodiment.

Referring now to FIG. 5, therein is shown a second example of the flow overview of the detection mechanism 116 operating within the measurement system 100 of FIG. 1 in a second embodiment. For example, the detection mechanism 116 can include operations providing a spectrally selected, polarized beam imprinted with a continuous phase gradient and projected as a narrow, well-focused line onto the sample 114 by relay optics that preserve image quality even at a steep incidence angle. Also for example, the reflected line can be magnified, its polarization converted to brightness variations, and the resulting intensity profile can be captured in a single pass to deliver rapid ellipsometric data.

In an illustrated embodiment, the detection mechanism 116 can include the light source 202, a monochromator 502, a collimator 504, the incident polarizer 204, the spatially-varying waveplate (SVWP) 402, a telecentric relay 506, the sample 114, an objective lens 524, the reflection polarizer 208, the tube lens 540, the linear detector array 304, and the line-scan imaging operation 406. For example, the spatially-varying waveplate (SVWP) 402 can include a range 530, a phase map 532, a different phase delay 534, and a continuous phase-retardance gradient 536.

For example, the light source 202 can transmit a broadband illumination that can be spectrally filtered by the monochromator 502 to select a wavelength band. For example, the collimator 504 can convert the beam with the wavelength band from the monochromator 502 into a parallel beam for uniform downstream processing.

As an example, the incident polarizer 204 can receive the beam from the collimator 504. As another example, the incident polarizer 204 can transmit only the electric-field component of the received beam that is aligned with a transmission axis of the incident polarizer 204, producing a beam that can be fully linearly polarized in a known orientation.

The spatially-varying waveplate 402 can receive the beam from the incident polarizer 204 to generate and output an encoded polarized light 520. As an example, the spatially-varying waveplate 402 can impose the range 530 of retardance on the received beam to generate the encoded polarized light 520 so each point across an aperture of the spatially-varying waveplate 402 outputs the different phase delay 534, to produce the encoded polarized light 520 that carries the phase map 532 into the downstream optics. As another example, the range 530 can vary from 0→2π (radians).

For example, the spatially-varying waveplate 402 can generate the phase map 532 with the continuous phase-retardance gradient 536 spanning the range 530 in the spatially-varying waveplate 402. As an example, the spatially-varying waveplate 402 can vary the range 530 continuously from 0 to 2π, thereby creating the phase map 532 whose gradient encodes compensator states spatially.

As another example, the continuous phase-retardance gradient 536 is the smooth, monotonic rise in optical retardance that the spatially-varying waveplate 402 imposes along the phase-gradient direction 516 of the spatially-varying waveplate 402. For example, at one edge of the spatially-varying waveplate 402, the retardance starts at 0 radians and increases steadily, reaching 2π radians at the opposite edge. The full excursion from 0 radians to 2π radians is the range 530.

Continuing with the example, every infinitesimal location (or point) on the spatially-varying waveplate 402 acquires its own local retardance value, and the spatially-varying waveplate 402 collecting those point-by-point values forms the two-dimensional phase map 532. Each local retardance in the phase map 532 is a different phase delay 534 that is embedded onto or included in the outgoing beam as the encoded polarized light 520.

Continue with the example, because the telecentric relay 506 images the spatially-varying waveplate 402 one-to-one, the encoded polarized light 520 is delivered to the sample 114 as the illumination line 522, so every position along the illumination line 522 inherits exactly or substantially the same phase delay 534 that originated from the matching position on the spatially-varying waveplate 402. As an example, the continuous phase-retardance gradient 536 specifies how the range 530 is distributed across the aperture or the area of the spatially-varying waveplate 402, the phase map 532 records the distribution, each entry of the phase map 532 is a specific, different phase delay 534, and the encoded polarized light 520 transports the ordered set of different phase delays 534 to produce the spatially multiplexed illumination line 522 on the sample 114.

As an example, the spatially-varying waveplate 402 changes the optical retardance smoothly or continuously, without discrete steps along the phase-gradient direction 516, so that the optical retardance increases monotonically from 0 radians to 2π radians across the full range 530. In this example, because this retardance varies point-by-point, the spatially-varying waveplate 402 produces a positional table of retardance values in the phase map 532, and each individual value in that table corresponds to a different phase delay 534 that is carried by the encoded polarized light 520 and mapped onto the illumination line 522.

For example, the range 530 specifies the total span of optical-retardance values produced across the spatially-varying waveplate 402, which can include 0 to 2π. Within that span, the phase map 532 can include the two-dimensional pattern that assigns a specific retardance value to every location on the aperture. For example, any single value taken from that pattern, at a given x- or y-coordinate, can constitute the different phase delay 534, so the phase map 532 is effectively a continuum of such local phase-delay points distributed over the full range 530.

For example, the spatially-varying waveplate 402 can be implemented with a spatial light modulator or a patterned diffractive optical element for generating and outputting the encoded polarized light 520. The spatial light modulator and the patterned diffractive optical element will be described further below. The spatially-varying waveplate 402 can receive the beam from the incident polarizer 204 to generate and output the encoded polarized light 520. As an example, the spatially-varying waveplate 402 can impose the range 530 of retardance on the received beam to generate the encoded polarized light 520 so each point across an aperture or an area of the spatially-varying waveplate 402 outputs the different phase delay 534, to produce the encoded polarized light 520 that carries the phase map 532 into the downstream optics.

For example, the spatially-varying waveplate 402 can operate or execute based on configuration or control by firmware, instructions, or code executable by a control circuit. As an example, instructions executable by the control circuit can control execution of the spatially-varying waveplate 402 to generate the encoded polarized light 520. As a specific example, the instruction first loads a voltage-pattern look-up table of drive values that represents the desired 0→2π phase-retardance gradient, then streams those drive values to a liquid-crystal-on-silicon (LCOS) backplane to write the pattern across the waveplate aperture in real time. Also as an example when the spatially-varying waveplate 402 is instead a nano-patterned DOE, the instruction selects the appropriate optic from a motorized turret and records its serial number so the downstream models know which fixed phase map is present.

As another example, a feedback routine instruction polls an inline polarimeter and, if the measured polarization deviates from target by more than a specific degree, the instruction dither-adjusts the LCOS voltages (or flags the DOE as out of tolerance) to maintain phase accuracy. In these examples, the instructions reliably convert the incident linearly-polarized beam into the encoded polarized light 520 that carries a known, spatially multiplexed set of phase delays.

For example, the telecentric relay 506 can include a front lens 508, a rear lens 510, a magnification 512, an optical aberration 514, and a condition 518. For illustrative purposes, the telecentric relay 506 is shown as a 4-f system, although the telecentric relay 506 can be implemented with any other relay configuration.

As an example configuration, the telecentric relay 506 can include a 4-f relay built from two identical achromatic doublets. In this example configuration, the lenses of focal length f are spaced by 2 f. The spatially-varying waveplate 402 can be placed at the front focal plane of the first lens and the sample 114 at the rear focal plane of the second lens. The intermediate Fourier plane can host a field stop or aberration-control element. This configuration maintains one-to-one magnification, passes the phase map of the spatially-varying waveplate 402 without distortion, and keeps principal rays parallel to the relay axis (telecentricity) so angle of incidence (AOI) induced focus errors are minimized.

As an example configuration, the telecentric relay 506 can include a 4-f relay with an infinity-corrected microscope objective lens (front) and a tube lens (rear). In this example, the objective lens forms a collimated beam that the tube lens refocuses onto the sample 114. Overall spacing equals objective lens's back focal distance and the tube-lens focal length.

This configuration offers higher numerical aperture and better aberration control than simple doublets.

For example, the telecentric relay 506 can be coupled to the spatially-varying waveplate 402 to receive the encoded polarized light 520 from the spatially-varying waveplate 402. Also for example, the telecentric relay 506 can be tilted under the condition 518 for generating and projecting the illumination line 522 on the sample 114 with the illumination line 522 corresponding to the phase map 532 carrying the different phase delay 534 based on the encoded polarized light 520, as further described below.

For example, the telecentric relay 506 can be tilted under the condition 518 at an angle that aligns the image plane of the telecentric relay 506 with the tilted surface of sample 114, so every ray emerging from the telecentric relay 506 can intersect the sample 114 at the same focal depth. Also for example, because the telecentric relay 506 can remain telecentric while being tilted, the telecentric relay 506 can project a sharp, edge-to-edge reproduction of the SVWP aperture as the illumination line 522 onto the sample 114. As an example, the angle corresponding to the condition 518 can include a Scheimpflug arrangement.

Continue in this example, the one-to-one imaging property of the telecentric relay 506 can map each x-position of the spatially-varying waveplate 402 directly onto substantially the same x-position along the illumination line 522. In other words, the local retardance distribution called the phase map 532 and the associated different phase delay 534 at each point on the surface of spatially-varying waveplate 402 is preserved across the entire projected illumination line 522 (or stripe), and every spot or location along the illumination line 522 corresponds to its originating spot on the spatially-varying waveplate 402. As an example, because the telecentric relay 506 images the spatially-varying waveplate 402 one-to-one, each of these spots along the illumination line 522 comes from, and corresponds to, a unique point on the spatially-varying waveplate 402.

For example, the encoded polarized light 520 is the beam transmitted from the spatially-varying waveplate 402 that already contains the phase map 532 in the wavefront of the encoded polarized light 520. Also for example, the telecentric relay 506 does not add new phase information, and can transport the wavefront so that the illumination line 522 (and thus the interaction with sample 114) is based on or determined by the phase content embedded in the encoded polarized light 520.

For example, the telecentric relay 506 can include the front lens 508 and the rear lens 510. As an example, the front lens 508 and the rear lens 510 can be arranged at a 4f separation so that the telecentric relay 506 can project the SVWP-modulated phase onto sample 114 without distortion.

For example, a 4f separation refers to a front lens and a rear lens that are separated by the sum of their focal lengths (f+f=2f), the object is placed one focal length (f) in front of the front lens, and the image plane is located one focal length (f) behind the rear lens, resulting in the total object-to-image distance or separation is four focal (4f) lengths.

For example, the telecentric relay 506 can include the magnification 512, the optical aberration 514, and the condition 518 for the telecentric relay 506 to control image scale, minimize aberrations, preserve the direction of the phase gradient, and operate under a defined tilt condition. Also for example, the telecentric relay 506 can be implemented with a configuration that can tilt the telecentric relay 506 relative to sample 114 so focus can be preserved across the large angle of incidence (AOI). For example, the telecentric relay 506 can output the illumination line 522, which can strike or project onto the sample 114.

For example, the telecentric relay 506 can reduce the optical aberration 514 of the illumination line 522 with the front lens 508 and the rear lens 510 of the telecentric relay 506. As an example, the front lens 508 and the rear lens 510 can be achromatic doublets whose matched curvatures minimize field curvature, thereby reducing the optical aberration 514 so that the illumination line 522 remains sharp across the sample 114.

For example, the telecentric relay 506 can project the illumination line 522 on the sample 114 with the magnification 512. As an example, the spacing of the front lens 508 and the rear lens 510 can set the magnification 512 in unity for direct mapping or another ratio for field resizing, thus controlling the width of the phase-encoded stripe on the sample 114. As another example, when the magnification 512 is set in unity, the magnification 512 includes a 1:1 scale, and the telecentric relay 506 projects the encoded polarized light 520 from the spatially-varying waveplate 402 as the illumination line 522 onto the sample 114 without enlarging or shrinking. As another example, by contrast, the field resizing refers to using a magnification other than unity (e.g., 0.5× to shrink or 2× to enlarge), allowing the telecentric relay 506 to compress a larger SVWP aperture onto a smaller area on the sample 114 or expand a small SVWP pattern to cover a wider line on the sample 114.

For example, the telecentric relay 506 can project the illumination line 522 on the sample 114 with the front lens 508 or the rear lens 510 of the telecentric relay 506 tilted relative to the spatially-varying waveplate 402 and the sample 114 for satisfying the condition 518. As an example, the rear lens 510 can be mounted at a tilt angle in the condition 518 so that the light rays of the illumination line 522 projected on the sample 114 intersect the tilted plane of the sample 114 at equal focus along the entire line, preserving resolution at large AOI. As another example, the entire line refers to the full, end-to-end length of the illumination line 522, which is every point along the projected stripe from one extremity to the other on the sample 114, so the tilt ensures uniform focus and resolution across that complete span.

As an example, the telecentric relay 506 can include the 4f system of two lenses (e.g., the front lens 508 and the rear lens 510) designed to minimize optical aberration, where each lens is composed of approximately three singlet elements. For example, a 4f system includes two front and rear lenses that are separated by the sum of their focal lengths (f+f=2f), the object is placed one focal length (f) in front of the front lens, and the image plane is located one focal length (f) behind the rear lens, resulting in the total object-to-image distance or separation of four focal (4f) lengths.

For example, the telecentric relay 506 can operate or execute based on configuration or control by firmware, instructions, or code executable by a control circuit. As an example, instructions executable by the control circuit can control execution of the telecentric relay 506 to project the illumination line 522 on the sample 114. As a specific example, the instruction stores a Scheimpflug-solver algorithm that, given the user-selected angle of incidence, calculates the exact tilt angle (e.g., the condition 518) for the telecentric relay 506 to keep the projected illumination line 522 in focus across the sample 114's plane. Also as an example, stepper-motor commands then drive a precision gimbal so the front lens 508 and the rear lens 510 of the telecentric relay 506 reach that computed tilt while encoder feedback verifies sub-arc-minute accuracy.

For a specific example, during acquisition, the control circuit executed by the instructions compares live image-sharpness metrics against a calibration curve. If sharpness drifts, the control circuit nudges the telecentric relay 506's tilt or tweaks the magnification 512 by moving the front lens

508 and the rear lens 510 a few microns to re-establish one-to-one focus. In these examples, the instructions ensure the encoded polarized light 520 is relayed as a distortion-free illumination line 522 on the sample 114 even at high AOI.

It has been unexpectedly found that the telecentric relay 506 projects the SVWP-modulated phase in the encoded polarized light 520 onto the sample 114 without distortion, while remaining compatible with the Scheimpflug tilt for providing the entire illumination line 522 in focus at large angles of incidence (AOI).

It has also been unexpectedly found that the integration of SVWP and line-scan by using a (4f) telecentric relay tilted under a (Scheimpflug) condition solves the problem of not maintaining focus and phase fidelity at the required high AOI (angle of incidence) by overcoming these limitations.

It has been unexpectedly found that the telecentric relay 506 with a tilt geometry provides the phase gradient remains sharply resolved across the entire illuminated stripe on the sample 114.

For example, the measurement system 100 can include the objective lens 524 together with the tube lens 540 as the downstream imaging optics that collect the reflected illumination line from the sample 114 and deliver the line well focused to the reflection polarizer 208 and the linear detector array 304. As an example, the objective lens 524 and the tube lens 540 can include microscope objective or imaging optics. As another example, the objective lens 524 and the tube lens 540 can include a telecentric design that produces a focused line with geometry accuracy and angle consistency.

For example, the objective lens 524 can collect the reflected line from the sample 114, while maintaining numerical-aperture and working-distance specifications. For example, maintaining numerical-aperture specifications can ensure that the objective lens 524 collects the full cone of reflected rays of the reflected line to preserve signal strength and resolution. Also for example, meeting working-distance specifications can keep the front element of the objective lens 524 far enough from the sample 114 to avoid mechanical interference yet still remain inside the depth-of-field of the telecentric relay 506.

As an example, the reflection polarizer 208 can project the altered polarization of the line from the objective lens 524 onto a transmission axis of the reflection polarizer 208, converting phase information from the objective lens 524 into intensity. Also as an example, the tube lens 540 can relay or transmit the focused line from the reflection polarizer 208 onto the linear detector array 304.

For example, the tube lens 540 can re-image the intensity-modulated line emerging from the reflection polarizer 208, bending the parallel chief rays into a telecentric bundle so that the rays converge to a sharp, one-to-one replica of the illumination line at the detector plane of the linear detector array 304. This re-imaged line can include an intensity profile proportional to the phase-encoded signal that can be delivered directly onto the active pixel row of the linear detector array 304 for electronic readout.

For example, the linear detector array 304 can include pixels 526, an axis 528, and the line image 306. For example, the linear detector array 304 can include camera, line-scan CMOS sensor, time-delay-integration (TDI) CCD, or any other detectors that can provide the pixel-level sampling for line-scan ellipsometry. As a specific example, the linear detector array 304 can include a CCD panel with either 2048×128 or 1024×128 pixels. As another example, the linear detector array 304 can include a camera that captures phase retardation information along the line-scan direction, so approximately 100-200 pixels of resolution are needed along that axis, and the resolution in the vertical direction corresponds to the spatial resolution of the measurement.

For example, the linear detector array 304 can be coupled to the telecentric relay 506 through the objective lens 524, the reflection polarizer 208, and the tube lens 540. For example, the linear detector array 304 can generate or form the line image 306 of the illumination line 522 after receiving the re-imaged line from the tube lens 540. As an example, the linear detector array 304 can receive the re-imaged line from the tube lens 540, which can include a representation of the reflected illumination line 522 from the sample 114, and convert the re-imaged line into the line image 306, with a one-dimensional intensity profile ready for ellipsometric reconstruction.

For example, the linear detector array 304 can include a line-scan sensor 538 for forming or generating the line image 306 of the illumination line 522. As an example, the line image 306 is generated with a number of the pixels 526 along the axis 528 of the linear detector array 304, where the axis 528 corresponds to the phase-gradient direction 516. As another example, the axis 528 can align with or correspond to the phase-gradient direction 516 so that each of the pixels 526 samples a distinct retardance state of the illumination line 522.

For example, the operation of generating the line image 306 is for testing the sample 114 based on the line image 306. As an example, the linear detector array 304 can convert the spatially-encoded polarization information into the line image 306 as a one-dimensional array of intensity values that preserves the pixel-to-position correspondence along the illuminated stripe on the sample 114. As a specific example, ellipsometric software can then fit the intensity-versus-pixel data to polarization-transfer models, solving for parameters Y and A at each line position. From those parameters, the linear detector array 304 can extract properties, such as local refractive index, thickness, or other optical constants of the sample 114. By scanning (or repeating) the illumination at successive locations, the measurement system 100 can build a high-resolution map of these properties, effectively testing the sample 114 for uniformity, layer integrity, and process-induced variations.

As another example, the linear detector array 304 can sample the intensity distribution of the re-imaged line from the tube lens 540 with the pixels 526 along the axis 528. The linear detector array 304 can stream a sequence of electrical signals that form the line image 306. For example, the sequence of electrical signals can populate a data cube indexed by position, wavelength, and intensity, enabling ellipsometric reconstruction for every point along the line scan direction of the line-scan imaging operation 406 in a single pass without mechanical compensator stepping.

As another example, the linear detector array 304 can process the intensity distribution of the re-imaged line from the tube lens 540. For example, each pixel in the linear detector array 304 can integrate the light power that tube lens 540 focuses onto it, convert that optical energy into charge, and then pass the charge through on-chip amplifiers and an analog-to-digital converter so the entire row is read out as a stream of digital numbers. This per-pixel digitization transforms the spatial intensity distribution of the re-imaged line into an ordered list of sample points, such as the line image 306. For example, the operation of processing the intensity distribution is for testing the sample 114.

For example, the linear detector array 304 can operate or execute based on configuration or control by firmware, instructions, or code executable by a control circuit. As an example, instructions executable by the control circuit can control execution of the linear detector array 304 to form the line image 306 of the illumination line 522 and to test the sample 114 based on the line image 306. As a specific example, the instruction controls a timing sequencer that triggers the linear detector array 304 when the reflected illumination line 522 reaches the sensor of the linear detector array 304, sets the exposure to avoid pixel saturation, and reads out the full row of pixels 526 through a high-speed FPGA.

As another example, a calibration routine instruction subtracts dark current, normalizes pixel-to-pixel gain, and packages the intensity vector as the line image 306. As another example, code for ellipsometric-reconstruction then fits that vector to a polarization-transfer model to extract $\Psi$ and $\Delta$ values for every sampled point, converts those values into layer thickness and refractive-index data, and overlays the results onto a process-control chart. As another example, if any computed thickness deviates from a specification window, the software instruction flags the corresponding x-position on the sample 114 as a defect and sends a fail signal to the factory host.

In an illustrated embodiment, the measurement system 100 can include an actual optical system structure applying a 4f system. For example, the telecentric relay 506 can include a 4f relay that projects a modulated phase of the encoded polarized light 520 from the spatially-varying waveplate 402 onto the sample 114 without distortion. For example, the measurement system 100 can include a Scheimpflug arrangement in the telecentric relay 506 that preserves focus on the tilted sample plane of the sample 114 for a large AOI.

The invention relates to a high-speed, high-resolution spectroscopic ellipsometry (SE) system enabled by spatial phase multiplexing and line-scan detection. For example, the system integrates a Spatially-Varying Waveplate (SVWP) with a line-scan camera, replacing mechanical modulation components and eliminating the need for raster scanning or angle stepping. For example, the SVWP introduces a continuous 0-2$\pi$ phase retardation gradient along the scan axis. As an example, as the sample translates under the line-scan detector, each pixel row receives light modulated at a different phase state, enabling full ellipsometric data acquisition from a single pass.

It has been unexpectedly found that this architecture significantly improves measurement speed and spatial resolution at least by the integration of the SVWP, the line scanning capability, the 4f relay, or a combination thereof.

For example, the system also features a custom 4f optical relay to project the SVWP's modulation profile onto the sample without distortion. As a specific example, a Scheimpflug configuration is incorporated into the optical path to maintain focus across the line at large angles of incidence (AOI), preserving measurement fidelity.

As a specific example, the SVWP can be implemented as either: (a) a Liquid Crystal on Silicon (LCOS) spatial light modulator, or (b) a diffractive optical element (DOE) fabricated via femtosecond laser writing. This flexibility supports scalable manufacturing and adaptability across wavelength regimes, further enhancing the invention's applicability and patentability.

It has been unexpectedly found that the spatial phase multiplexing combined with the line-scan detection and supported by a tailored 4f+Scheimpflug optical train, yielding high-speed, high-resolution spectroscopic ellipsometry at least by the integration of the SVWP, the line scanning capability, the 4f relay, or a combination thereof.

Figure 6:
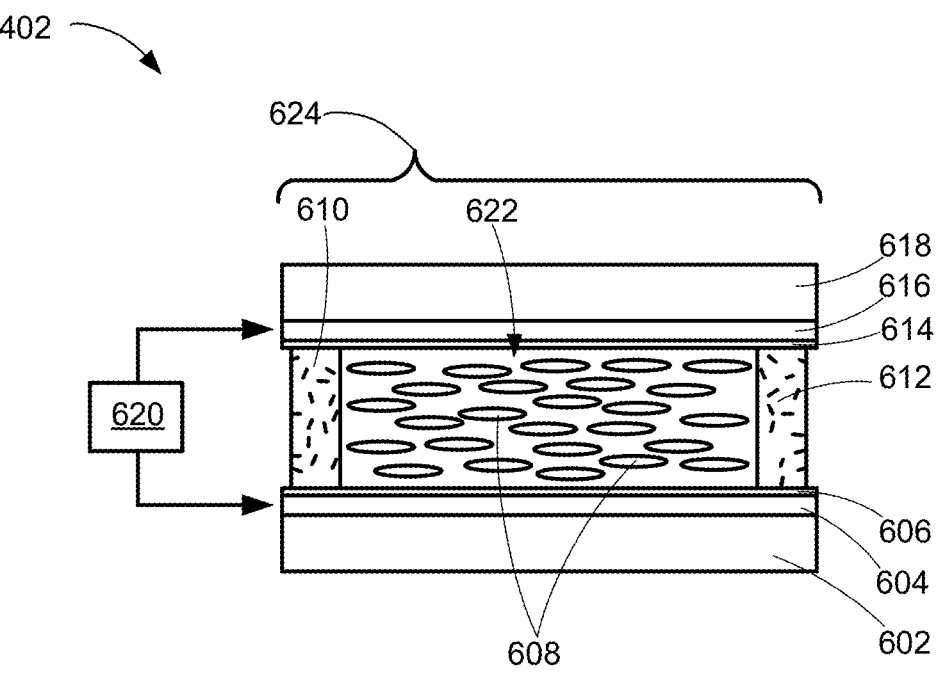
FIG. 6 is an exemplary structural diagram of a spatially-varying waveplate with a maximum retardance in an embodiment.

Referring now to FIG. 6, therein is shown an exemplary structural diagram of a spatially-varying waveplate 402 with a maximum retardance in an embodiment. As an illustrated embodiment, FIG. 6 depicts the spatially-varying waveplate 402 having a structure with liquid-crystal (LC) molecules with no voltage applied. In this example, the structure can include the LC variable retarder construction showing molecular alignment without applied voltage. The molecular orientation of the liquid-crystal molecules can vary across the aperture or an area in the structure of the spatially-varying waveplate 402.

For example, the spatially-varying waveplate 402 can be realized with a spatial light modulator 624. As a specific example, the spatial light modulator 624 can include LCOS-type liquid-crystal spatial-light modulator. For example, the spatial light modulator 624 can include a lower insulation layer 602, a lower conductive layer 604, a lower alignment layer 606, a first spacer 610, a second spacer 612, LC molecules 608, an upper alignment layer 614, an upper conductive layer 616, an upper insulation layer 618, and a voltage 620.

For example, the lower insulation layer 602 can be formed at a bottom side of the spatially-varying waveplate 402. The lower insulation layer 602 can provide mechanical rigidity and optical transparency for the spatially-varying waveplate 402. As an example, the lower insulation layer 602 can include fused silica, borosilicate glass, or any other dielectric.

For example, the lower conductive layer 604 can be formed over or directly on the lower insulation layer 602. As an example, the lower conductive layer 604 can include an electrode, a pad, or a contact. As another example, the lower conductive layer 604 can include indium-tin oxide (ITO), aluminum-doped zinc oxide (AZO), or any other conductors that can establish an electric field across an LC region. For example, the lower conductive layer 604 can connect to an external drive circuit when a voltage bias is needed.

For example, the lower alignment layer 606 can be formed over or directly on the lower conductive layer 604. As an example, the lower alignment layer 606 can provide a thin surface film that physically covers and adheres to the lower conductive layer 604. As another example, after deposition of the lower alignment layer 606 over the lower conductive layer 604, the lower alignment layer 606 can be mechanically rubbed, photo-aligned, or otherwise surface-treated so its microscopic grooves or molecular order present a preferred azimuth and pre-tilt angle.

Continue in this example, when the liquid-crystal molecules 608 are subsequently filled into the structure of the spatially-varying waveplate 402, the liquid-crystal molecules 608 dock against or anchor to this treated surface of the lower alignment layer 606 and adopt the preset orientation, thereby defining the starting director direction for the entire LC stack of the liquid-crystal molecules 608. For example, the lower alignment layer 606 can include rubbed polyimide, photo-aligned azo-dye polymer, or any other surface-treatment coating that can impose a uniform director tilt and azimuth.

For example, the director direction is the preferred, average orientation of the long axes of the liquid-crystal molecules 608, which is effectively the optical axis of the LC medium at any given point. Also for example, when the liquid-crystal molecules 608 anchor to the surface of the lower alignment layer 606, their collective alignment determines the director direction. Light travelling through the spatially-varying waveplate 402 experiences birefringence with respect to the director direction.

For example, birefringence is the property of a material, such as the oriented liquid-crystal layer, whereby it exhibits two different refractive indices for light polarized along two perpendicular directions (one parallel and one perpendicular to the LC director). Because the phase velocity differs for these orthogonal components, light emerging from the layer acquires a phase shift (retardance) whose magnitude depends on the birefringence value and the layer's thickness.

The lower alignment layer 606 can be in contact with the liquid-crystal molecules 608 and are structurally separated from the upper layers by the first spacer 610 and the second spacer 612.

For example, the first spacer 610 can include a microscopic pillar that structurally connects the lower alignment layer 606 and the upper alignment layer 614 on one end of the structure or the aperture as an area in the spatially-varying waveplate 402. For example, the first spacer 610 can be fabricated from silica beads embedded in UV-cured epoxy, polyimide posts defined by photolithography, or any other dielectric spacer technology that can set a precise cell gap. The first spacer 610 can keep the LC cavity thickness uniform across the aperture and prevent plate bowing.

For example, the second spacer 612 can include a microscopic pillar formed at an opposite end of the structure from the first spacer 610, providing a second structural support for the cell gap where the liquid-crystal molecules 608 are filled in the structure. For example, the second spacer 612 can be fabricated in a similar manner to the first spacer 610. As another example, the second spacer 612 can be fabricated from silica micro-beads, SU-8 photoresist posts, or any other bead-or-post structure suited to high-precision gap control. Together, the first spacer 610 and the second spacer 612 ensure that the LC molecules 608 experience a constant optical path length across the device.

For example, the LC molecules 608 can occupy the entire gap between the alignment layers and can provide the variable birefringence needed for phase modulation. As an example, the LC molecules 608 can include a nematic mixture such as Merck E7, a polymerizable reactive mesogen blend, or any other liquid-crystal formulation engineered for wide spectral transparency.

In an illustrated embodiment, the voltage 620 is not applied to the lower conductor layer 604 and the upper conductor layer 616, or simply voltage (V)=0. The LC director profile varies continuously, generating the spatial retardance gradient.

For example, the upper alignment layer 614 can replicate the orientation-controlling function of the lower alignment layer 606. The upper alignment layer 614 can formed over or directly on the first spacer 610 and the second spacer 612. As an example, the upper alignment layer 614 can include buffed polyimide, photo-oriented sulfonic dye, or any other alignment coating. The upper alignment layer 614 can be in contact with the liquid-crystal molecules 608 and are structurally separated from the lower layers by the first spacer 610 and the second spacer 612.

For example, the upper conductive layer 616 can be formed over or directly on the upper alignment layer 614. As an example, the upper conductive layer 616 can include an electrode, a pad, or a contact. As another example, the upper conductive layer 616 can include indium-tin oxide (ITO), aluminum-doped zinc oxide (AZO), or any other conductors that can establish an electric field across an LC region. As another example, the upper conductive layer 616 can include fluorine-doped tin oxide (FTO) or any other clear conductor compatible with the chosen LC chemistry. Together with the lower conductive layer 604, the electrode pair can apply the voltage 620 across the liquid-crystal molecules 608 when active voltage drive is needed.

For example, the upper insulation layer 618 can serve as the top window of the spatial light modulator 624 and provides environmental sealing for the LC cell. The upper insulation layer 618 can be formed over or directly on the upper conductive layer 616. As an example, the upper insulation layer 618 can include fused silica, quartz, or any other low-birefringence glass suitable for high optical quality. The upper insulation layer 618 and the lower insulation layer 602 together can be formed to provide an encapsulation for all internal layers within the structure.

In an illustrated embodiment, the voltage 620 is not applied. For example, the voltage 620 can include a zero-bias state to show that the spatially-varying waveplate 402 operates in a passive mode in which the LC molecules 608 remain in their preset orientation profile.

As an example, the spatially-varying waveplate 402 can include the retardance between the s- and p-polarization components of the incident light that can vary continuously along the phase-gradient direction 516 of FIG. 5. In this implementation, the position-dependent birefringence of the LC molecules 608 can introduce a local phase shift that rises continuously from 0 radians to $2\pi$ radians across the full range 530 of FIG. 5, so each x-location across the aperture imposes a unique phase delay between the orthogonal polarization states.

Also as an example embodiment, the spatially-varying waveplate 402 can be realized with the spatial light modulator 624 (or a Liquid-Crystal Variable Retarder) mounted between the lower insulation layer 602 and the upper insulation layer 618. In this configuration, when voltage 620 is zero (V=0), a zero-bias condition is set, and there is no voltage supplied to the upper conductive layer 616. The molecular structures of the LC molecules 608 align with the preset director established by alignment layers 606 and 614, thereby producing the maximum retardance available from the LC mixture. As a drive voltage, such as the voltage 620, is later applied, the effective birefringence, and thus the local retardance, can decrease under electronic control.

As an illustrative example, in the zero-bias condition, the positions or orientations of the LC molecules 608 are substantially parallel to the lower insulation layer 602, the lower conductive layer 604, the lower alignment layer 606, the upper insulation layer 618, the upper conductive layer 616, and the upper alignment layer 614, and substantially perpendicular to the first spacer 610 and the second spacer 612. As an example, this orientation configuration follows the axis set by the lower alignment layer 606 and the upper alignment layer 614.

The spatial light modulator 624 can include a cavity 622. For example, the cavity 622 is a region within the spatial light modulator 624 where the LC molecules 608 locate. The cavity 622 can be surrounded vertically by the lower alignment layer 606 and the upper alignment layer 614, and laterally by the first spacer 610 and the second spacer 612. For example, the vertical thickness of the cavity 622 can be substantially uniform, as determined by the vertical lengths of the first spacer 610 and the second spacer 612.

As an example in the zero-bias condition, a number of the LC molecules 608 adjacent to the lower alignment layer 606 and the upper alignment layer 614 in the middle region of the cavity 622 are substantially parallel to the lower insulation layer 602, the lower conductive layer 604, the lower alignment layer 606, the upper insulation layer 618, the upper conductive layer 616, and the upper alignment layer 614. As another example, a number of the LC molecules 608 are substantially perpendicular to the first spacer 610 and the second spacer 612.

Figure 7:
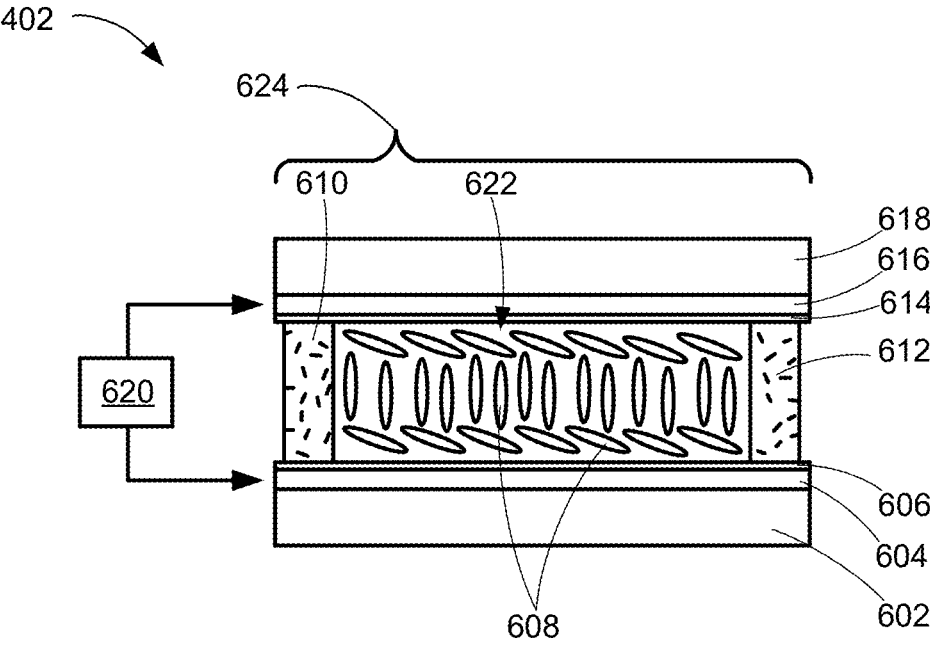
FIG. 7 is an exemplary structural diagram of the spatially-varying waveplate with a minimum retardance in an embodiment.

Referring now to FIG. 7, therein is shown an exemplary structural diagram of the spatially-varying waveplate 402 with a minimum retardance in an embodiment. In an illustrative embodiment, FIG. 7 depicts the structure of the spatially-varying waveplate 402 with a minimum retardance when the voltage 620 is applied (V>>0). In this example, the structure can include the spatial light modulator 624 or the LC variable retarder construction showing molecular alignment with applied voltage.

As an example, the spatially-varying waveplate 402 can include the retardance between the s- and p-polarization components of the incident light that can vary continuously along the phase-gradient direction 516 of FIG. 5. In this implementation, the position-dependent birefringence of the LC molecules 608 can introduce a local phase shift that rises continuously from 0 radians to $2\pi$ radians across the full range 530 of FIG. 5, so each x-location across the aperture imposes a unique phase delay between the orthogonal polarization states.

For example, the spatial gradient remains but overall magnitude is reduced due to the applied voltage. The device still supports the full $0 \rightarrow 2\pi$ span, but the effective retardance is minimized under high bias with V>>0.

As an illustrative example, the structure of the spatially-varying waveplate 402 in FIG. 7 is substantially the same as that in FIG. 6, except in this example, the voltage 620 is applied to the upper conductive layer 616, and an applied-voltage condition is set, which produces an electric field across the LC layer of the LC molecules 608 within the cavity 622. As an example, in the applied-voltage condition, the LC molecules 608 are re-oriented or changed, driving the spatially-varying waveplate 402 from a maximum-retardance configuration to a minimum-retardance configuration.

As an example in the applied-voltage condition, a number of the LC molecules 608 adjacent to the lower alignment layer 606 and the upper alignment layer 614 are tilt at an acute angle from the lower alignment layer 606 and the upper alignment layer 614. As another example, a number of the LC molecules 608 in the middle region of the cavity 622 are substantially perpendicular to the lower insulation layer 602, the lower conductive layer 604, the lower alignment layer 606, the upper insulation layer 618, the upper conductive layer 616, and the upper alignment layer 614, and substantially parallel to the first spacer 610 and the second spacer 612.

Figure 8:
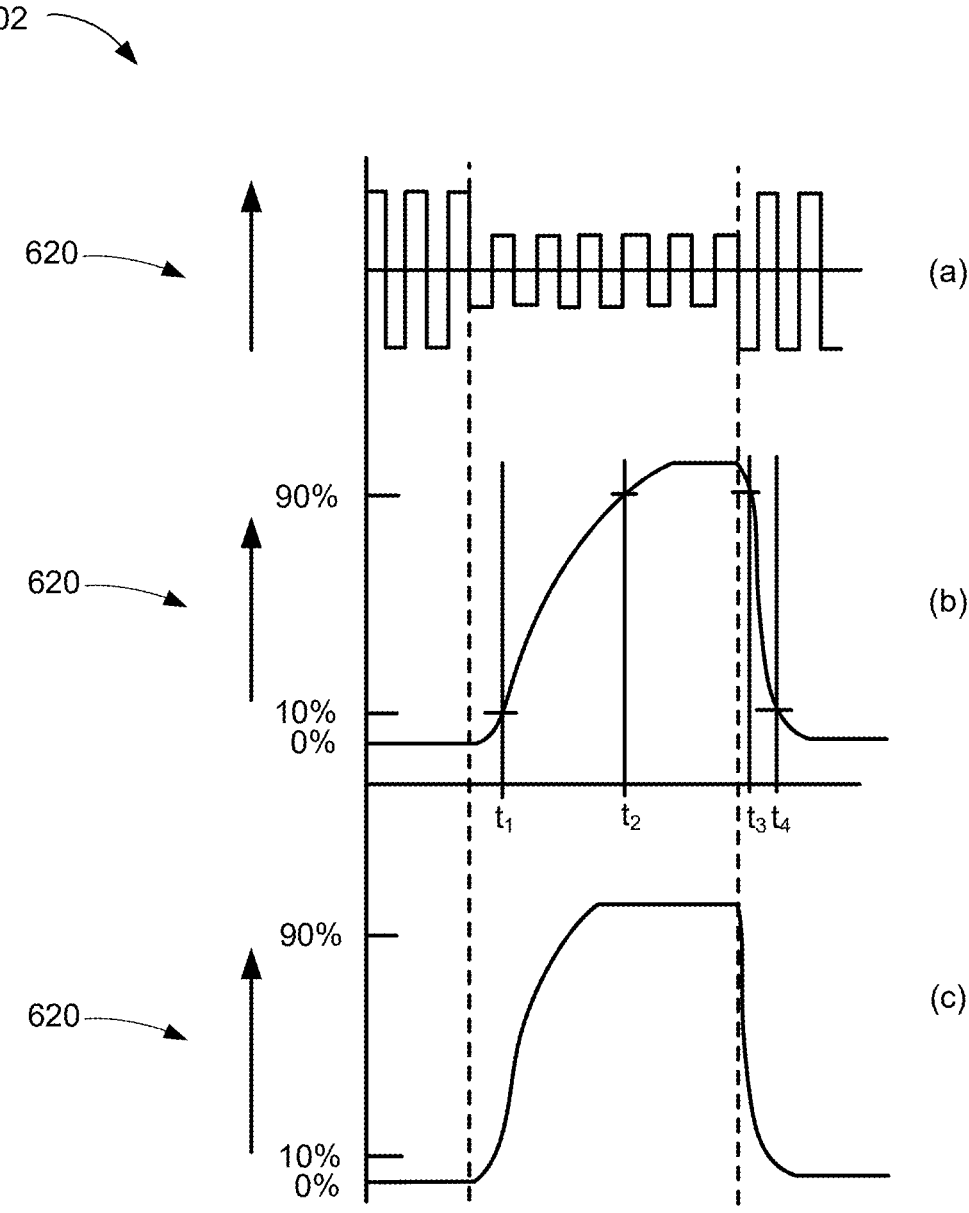
FIG. 8 is an example of a temporal response of the spatially-varying waveplate in an embodiment.

Referring now to FIG. 8, therein is shown an example of a temporal response of the spatially-varying waveplate 402 in an embodiment. As an illustrative embodiment, a set of graphs illustrating a square-wave drive voltage applied to the spatially-varying waveplate 402 and the corresponding typical and transient-nematic enhanced temporal retardance responses.

For illustrative purposes, the description associates the temporal response to a liquid-crystal variable retarder as an example of the spatially-varying waveplate 402, although it is understood that the temporal response can apply to other configurations of the spatially-varying waveplate 402. For a specific example, the temporal response can associate with the spatially-varying waveplate 402 that includes nano-patterned diffractive optical elements (DOE) fabricated by femtosecond-laser direct writing in fused silica, custom space-variant retarders built from a photo-aligned polymerizable LC film (sometimes called a "custom SVR"), as examples.

For a specific example, the spatially-varying waveplate 402 can include the temporal response of a liquid-crystal (LC) variable retarder driven by an applied square-wave voltage 620 in an embodiment. For illustrative purposes, the figure is divided into three stacked portions—labelled (a), (b), and (c) that share a common horizontal time axis and vertical volt-percentage scale marked at 0%, 10%, 90%, and 100%. Four dashed timing lines, $t_1$, $t_2$, $t_3$, and $t_4$, bracket the rise, hold, and decay intervals for clarity.

For example, portion (a) illustrates the voltage 620 applied to the LC variable retarder. In this example, the voltage 620 is a 2 kHz bipolar square wave whose duty cycle is approximately 50%. The alternating polarity ensures that long-term DC bias is avoided because excessive DC voltage can damage the liquid-crystal layer by ion accumulation or electro-chemical degradation.

For example, portion (b) plots the typical temporal response for half-wave operation at 632.8 nm and 21° C. Beginning at $t_1$, the retardance starts near 0% and climbs along an S-shaped curve, reaching 90% of its target value by $t_2$. Then, the retardance remains nominally constant until the drive polarity reverses at $t_3$. After that reversal, the retardance decays toward 0% and falls below 10% by $t_4$. These times characterize the rise and fall dynamics that dictate the frame-rate limit of an un-enhanced LC variable retarder.

For example, portion (c) depicts an improved temporal response obtained by the Transient Nematic Effect (TNE). In this trace, the same square-wave drive is supplemented either by over-driving amplitude for a brief interval or by inserting tailored pre-tilt pulses so that the LC molecules 608 of FIG. 6 re-orient more rapidly. As a result, the curve rises more steeply after $t_1$, reaches its 90% point sooner than in portion (b), and likewise decays faster after $t_3$, compressing the overall response window and enabling higher modulation bandwidth.

Continue with the example, portions (a)-(c) together demonstrate that the liquid-crystal variable retarder can maintain the designed spatial phase map while its temporal retardance can be tuned electronically. The square-wave voltage 620 prevents DC stress, the baseline curve in portion (b) represents standard nematic rise/fall behavior, and the TNE-enhanced curve in portion (c) shows that response time can be significantly shortened, providing an advantage for high-speed ellipsometric scanning where rapid phase modulation is needed.

Figure 9:
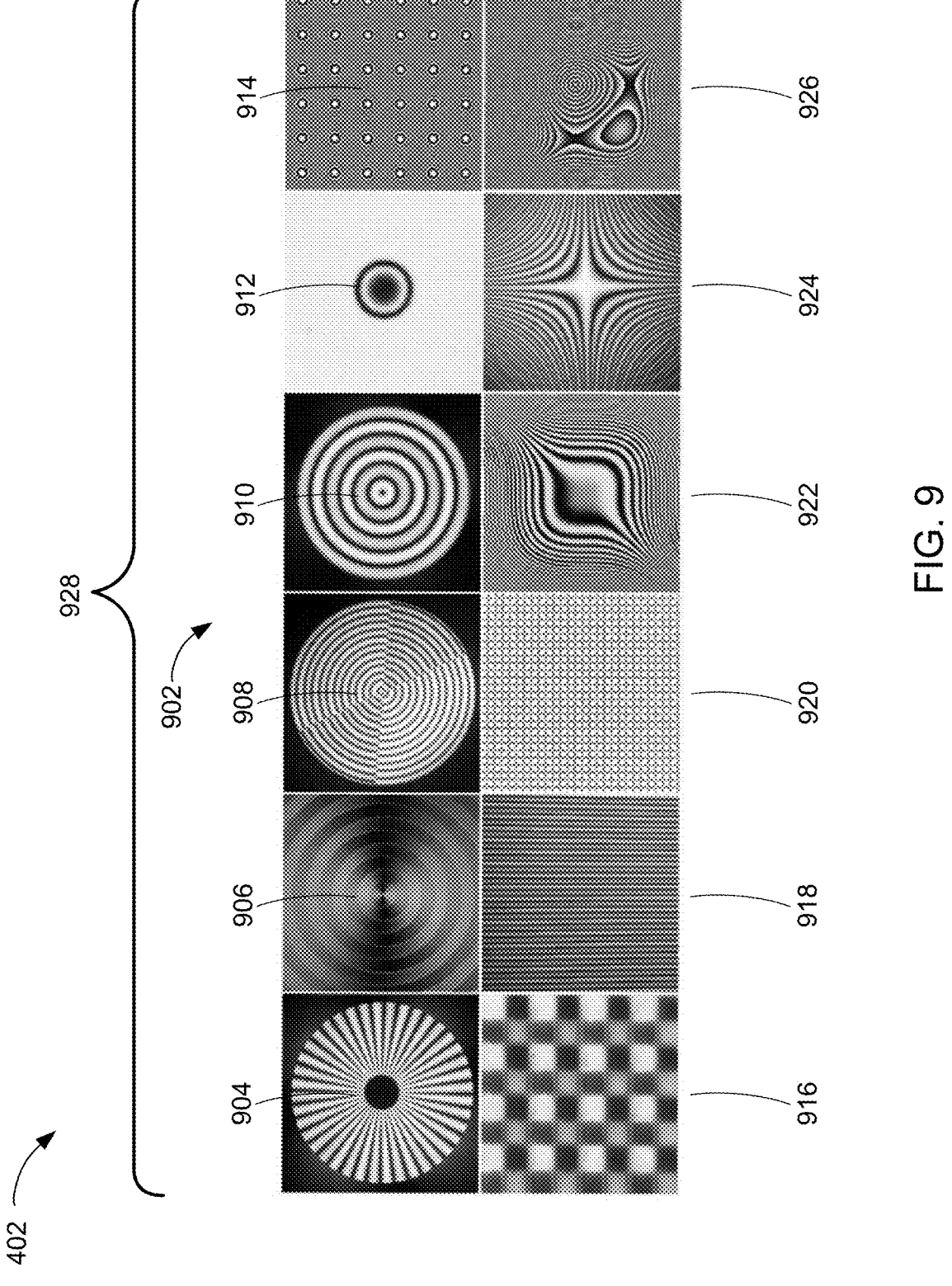
FIG. 9 are examples of a retardance-gradient pattern of the spatially-varying waveplate in an embodiment.

Referring now to FIG. 9, therein are shown examples of a retardance-gradient pattern 902 of the spatially-varying waveplate 402 in an embodiment. As an illustrative embodiment, the spatially-varying waveplate 402 can be implemented with a patterned diffractive optical element 928. As a specific example, the patterned diffractive optical element 928 can include custom space-variant retarders (SVRs), each generating and exhibiting the distinct retardance-gradient pattern 902 for tailored polarization conversion and beam shaping, as examples.

As an example embodiment, the patterned diffractive optical element 928 can include a retardance-gradient pattern 902 that is illustrated here by twelve discrete tiles—elements 904, 906, 908, 910, 912, 914, 916, 918, 920, 922, 924, and 926, each tile demonstrating how the same fabrication platform can realize a different, position-dependent phase map 532 of FIG. 5 for tailored polarization conversion and beam shaping.

For example, tile 904 can include a radial-burst pattern in which the local optical axis rotates azimuthally while retardance stays constant in radius, generating an azimuthal-polarization state when illuminated with linearly-polarized light. Also for example, tile 906 can include a radially decaying concentric gradient whose continuous phase map 532 of FIG. 5 can convert a beam into a Bessel-like profile whose radius contracts or expands with wavelength.

For example, tile 908 can implement a spiral phase ramp with its local retardance increases monotonically with azimuth so that the outgoing wavefront acquires orbital angular momentum. Also for example, tile 910 can include concentric ring steps that approximate a Fresnel zone plate, focusing one circular-polarization state while defocusing the orthogonal state. Also for example, tile 912 can depict a single bullseye aperture useful for creating a doughnut-shaped intensity profile. Also for example, tile 914 can repeat that bullseye into a two-dimensional grid for multiplexed spot arrays.

For example, tile 916 can include a checkerboard retardance whose $\pi/2$ phase offsets between adjacent squares convert linear polarization into circular with alternating handedness. Also for example, tile 918 can include a vertical-line grating that functions as a polarizing beam-splitter for s-versus p-components. Also for example, tile 920 can include a hexagonal dot grid that steers diffraction orders of opposite helicity into symmetric angles, enabling multi-spot illumination for parallel metrology.

For example, tile 922 can encode a saddle-phase profile that produces one-dimensional focusing along x and defocusing along y. Also for example, tile 924 can include a four-lobed star pattern that generates a vortex beam with topological charge ±2. Also for example, tile 926 can display an asymmetric vortex field that combines two different topological charges to sculpt a self-accelerating beam trajectory.

In an example embodiment, each tile (904-926) can be fabricated in any of the SVR technologies previously described, such as an LCOS-type liquid-crystal SLM, a photo-aligned polymerizable LC layer, or a nano-patterned DOE written by femtosecond laser. In this example, the tiles can share common design parameters, such as the range 530 of FIG. 5 ($0 \rightarrow 2\pi$ retardance), the phase map 532 of FIG. 5, the different phase delay 534 of FIG. 5, and the continuous phase-retardance gradient 536 of FIG. 5. Because the underlying fabrication process can write arbitrary pixel-level director orientation, the same hardware platform can replicate the retardance-gradient pattern 902 or any other mathematically-defined phase map, thereby demonstrating the versatility of the spatially-varying waveplate 402 for customized polarization control and beam-shaping applications.

Figure 10:
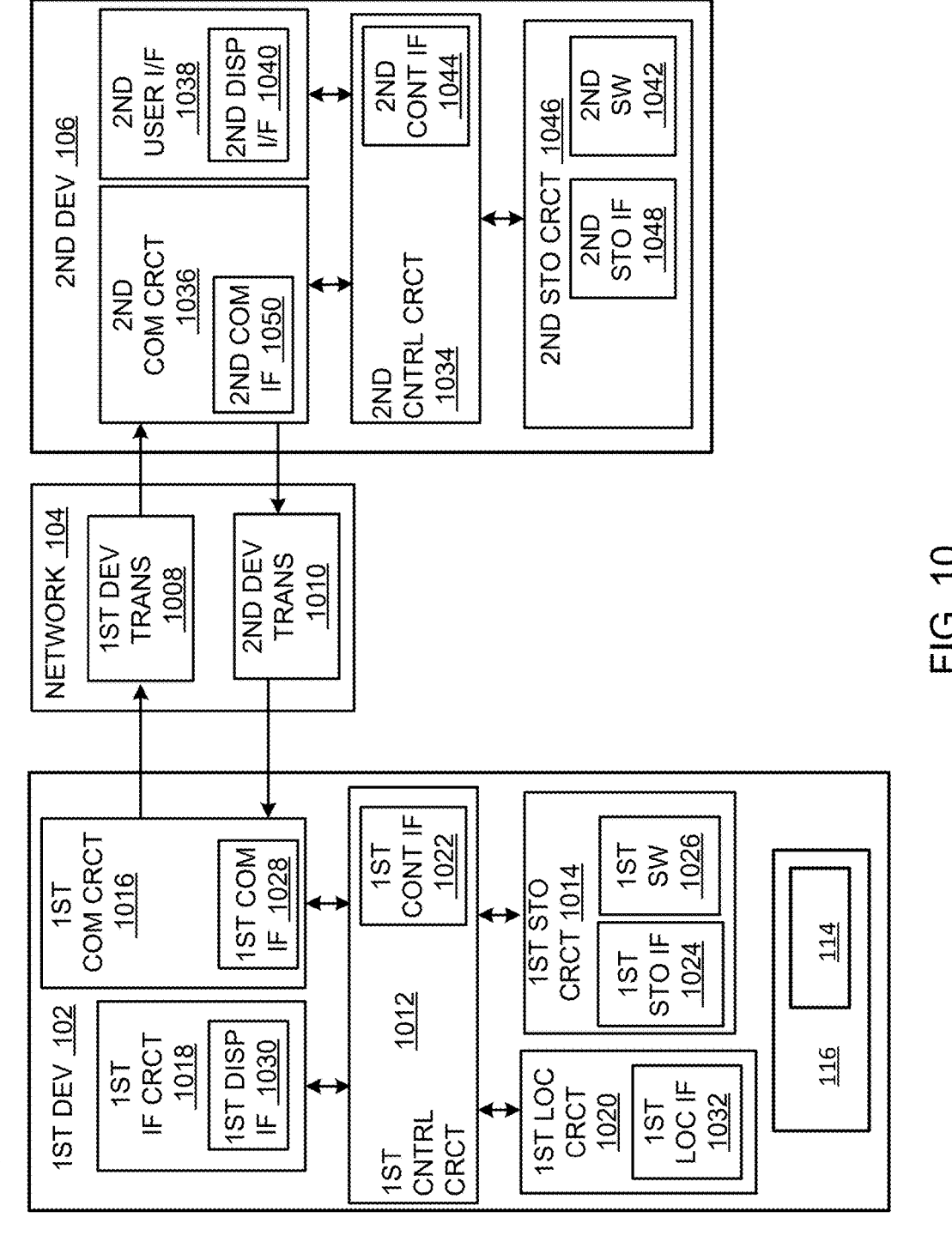
FIG. 10 is an exemplary block diagram of the measurement system in an embodiment.

Referring now to FIG. 10, therein is shown an exemplary block diagram of the measurement system 100 in an embodiment. The measurement system 100, a portion of the measurement system 100, or a combination thereof can execute the detection mechanism 116 of FIG. 1. The measurement system 100 can include the first device 102, the network 104, and the second device 106. The first device 102 can send information in a first device transmission 1008 over the network 104 to the second device 106. The second device 106 can send information in a second device transmission 1010 over the network 104 to the first device 102.

For illustrative purposes, the measurement system 100 is shown with the first device 102 as a client device, although it is understood that the measurement system 100 can include the first device 102 as a different type of device.

Also, for illustrative purposes, the measurement system 100 is shown with the second device 106 as a server, although it is understood that the measurement system 100 can include the second device 106 as a different type of device. For example, the second device 106 can be a client device. By way of an example, the measurement system 100 can be implemented entirely on the first device 102 with some functions of the detection mechanism 116 executed by a first control circuit 1012.

Also, for illustrative purposes, the measurement system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 1012, a first storage circuit 1014, a first communication circuit 1016, a first interface circuit 1018, and a first location circuit 1020. The first control circuit 1012 can include a first control interface 1022. The first control circuit 1012 can execute a first software 1026 to provide the intelligence of the measurement system 100.

The first control circuit 1012 can be implemented in a number of different manners. For example, the first control circuit 1012 can be a processor, an application specific integrated circuit (ASIC), an embedded processor, a microprocessor, a hardware control logic, a hardware finite state machine (FSM), a digital signal processor (DSP), or a combination thereof. The first control interface 1022 can be used for communication between the first control circuit 1012 and other functional units or circuits in the first device 102. The first control interface 1022 can also be used for communication that is external to the first device 102. The first control circuit 1012 can process information associated with the sample 114 and execute portions of the detection mechanism 116.

The first control interface 1022 can receive information from the other functional units/circuits or from external sources, or can transmit information to the other functional units/circuits or to external destinations. The external sources and the external destinations refer to sources and destinations external to the first device 102.

The first control interface 1022 can be implemented in different ways and can include different implementations depending on which functional units/circuits or external units/circuits are being interfaced with the first control interface 1022. For example, the first control interface 1022 can be implemented with a pressure sensor, an inertial sensor, a microelectromechanical system (MEMS), optical circuitry, waveguides, wireless circuitry, wireline circuitry, or a combination thereof.

The first storage circuit 1014 can store the first software 1026. The first storage circuit 1014 can also store the relevant information, such as data representing incoming samples 114, the detection mechanism 116 and the other embodiments, or a combination thereof.

The first storage circuit 1014 can be a volatile memory, a nonvolatile memory, an internal memory, an external memory, or a combination thereof. For example, the first storage circuit 1014 can be a nonvolatile storage such as non-volatile random-access memory (NVRAM), Flash memory, disk storage, or a volatile storage such as static random-access memory (SRAM).

The first storage circuit 1014 can include a first storage interface 1024. The first storage interface 1024 can be used for communication between the first storage circuit 1014 and other functional units or circuits in the first device 102. The first storage interface 1024 can also be used for communication that is external to the first device 102.

The first storage interface 1024 can receive information from the other functional units/circuits or from external sources, or can transmit information to the other functional units/circuits or to external destinations. The external sources and the external destinations refer to sources and destinations external to the first device 102. The first storage interface 1024 can receive input from and source data to the detection mechanism 116.

The first storage interface 1024 can include different implementations depending on which functional units/circuits or external units/circuits are being interfaced with the first storage circuit 1014. The first storage interface 1024 can be implemented with technologies and techniques similar to the implementation of the first control interface 1022.

The first communication circuit 1016 can enable external communication to and from the first device 102. For example, the first communication circuit 1016 can permit the first device 102 to communicate with the second device 106 and the network 104. The first communication circuit 1016 can interact with the second device 106 for implementing the detection mechanism 116.

The first communication circuit 1016 can also function as a communication hub allowing the first device 102 to function as part of the network 104 and not limited to be an endpoint or terminal circuit to the network 104. The first communication circuit 1016 can include active and passive components, such as microelectronics or an antenna, for interaction with the network 104.

The first communication circuit 1016 can include a first communication interface 1028. The first communication interface 1028 can be used for communication between the first communication circuit 1016 and other functional units or circuits in the first device 102. The first communication interface 1028 can receive information from the second device 106 for distribution to the other functional units/circuits or can transmit information to the other functional units or circuits.

The first communication interface 1028 can include different implementations depending on which functional units or circuits are being interfaced with the first communication circuit 108. The first communication interface 1028 can be implemented with technologies and techniques similar to the implementation of the first control interface 1022.

The first interface circuit 1018 allows the user 112 of FIG. 1 to interface and interact with the first device 102. The first interface circuit 1018 can include an input device and an output device. Examples of the input device of the first interface circuit 1018 can include a keypad, a touchpad, soft-keys, a keyboard, a microphone, a camera, an infrared sensor for receiving remote signals, or any combination thereof to provide data and communication inputs, such as the sample 114. The first interface circuit 1018 can receive the sample 114 provided by the user 112 that can be manipulated by the first control circuit 1012.

The first interface circuit 1018 can include a first display interface 1030. The first display interface 1030 can include an output device. The first display interface 1030 can include a projector, a video screen, a touch screen, a speaker, a microphone, a keyboard, and combinations thereof. The first display interface 1030 can allow the user 112 to view the results of the detection mechanism 116 and the other embodiments on the output device.

The first control circuit 1012 can operate the first interface circuit 1018 to display information generated by the measurement system 100 and receive input from the user 112. The first control circuit 1012 can also execute the first software 1026 for the other functions of the measurement system 100, including receiving location information from the first location circuit 1020. The first control circuit 1012 can further execute the first software 1026 for interaction with the network 104 via the first communication circuit 1016. The first control circuit 1012 can operate portions or all of the detection mechanism 116.

The first control circuit 1012 can also receive location information from the first location circuit 1020. The first control circuit 1012 can operate the detection mechanism 116 or portions thereof. The first control circuit 1012 can operate on information associated with the sample 114, as well as any of the output for the detection mechanism 116 and any of the embodiments for display to the user 112.

The first location circuit 1020 can be implemented in many ways. For example, the first location circuit 1020 can function as at least a part of the global positioning system, an inertial compute system, a cellular-tower location system, a gyroscope, or any combination thereof. Also, for example, the first location circuit 1020 can utilize components such as an accelerometer, gyroscope, or global positioning system (GPS) receiver.

The first location circuit 1020 can include a first location interface 1032. The first location interface 1032 can be used for communication between the first location circuit 1020 and other functional units or circuits in the first device 102.

The first location interface 1032 can receive information from the other functional units/circuits or from external sources, or can transmit information to the other functional units/circuits or to external destinations. The external sources and the external destinations refer to sources and destinations external to the first device 102. The first location interface 1032 can receive the global positioning location from the global positioning system (not shown).

The first location interface 1032 can include different implementations depending on which functional units/circuits or external units/circuits are being interfaced with the first location circuit 1020. The first location interface 1032 can be implemented with technologies and techniques similar to the implementation of the first control circuit 1012.

The second device 106 can be optimized for implementing an embodiment of the present invention in a multiple device embodiment with the first device 102. The second device 106 can provide the additional or higher performance processing power compared to the first device 102. The second device 106 can include a second control circuit 1034, a second communication circuit 1036, a second user interface 1038, and a second storage circuit 1046.

The second user interface 1038 allows an operator (not shown) to interface and interact with the second device 106. The second user interface 1038 can include an input device and an output device. Examples of the input device of the second user interface 1038 can include a keypad, a touchpad, soft-keys, a keyboard, a microphone, or any combination thereof to provide data and communication inputs. Examples of the output device of the second user interface 1038 can include a second display interface 1040. The second display interface 1040 can include a display, a projector, a video screen, a speaker, or a combination thereof.

The second control circuit 1034 can execute a second software 1042 to provide the intelligence of the second device 106 of the measurement system 100. The second software 1042 can operate in conjunction with the first software 1026. The second control circuit 1034 can provide additional performance compared to the first control circuit 1012. The second control circuit 1034 can execute instructions to implement all or some of the functions of the detection mechanism 116.

The second control circuit 1034 can operate the second user interface 1038 to display information. The second control circuit 1034 can also execute the second software 1042 for the other functions of the measurement system 100, including operating the second communication circuit 1036 to communicate with the first device 102 over the network 104.

The second control circuit 1034 can be implemented in a number of different manners. For example, the second control circuit 1034 can be a processor, an embedded processor, a microprocessor, hardware control logic, a hardware finite state machine (FSM), a digital signal processor (DSP), or a combination thereof.

The second control circuit 1034 can include a second control interface 1044. The second control interface 1044 can be used for communication between the second control circuit 1034 and other functional units or circuits in the second device 106. The second control interface 1044 can also be used for communication that is external to the second device 106.

The second control interface 1044 can receive information from the other functional units/circuits or from external sources, or can transmit information to the other functional units/circuits or to external destinations. The external sources and the external destinations refer to sources and destinations external to the second device 106.

The second control interface 1044 can be implemented in different ways and can include different implementations depending on which functional units/circuits or external units/circuits are being interfaced with the second control interface 1044. For example, the second control interface 1044 can be implemented with a pressure sensor, an inertial sensor, a microelectromechanical system (MEMS), optical circuitry, waveguides, wireless circuitry, wireline circuitry, or a combination thereof.

The second storage circuit 1046 can store the second software 1042. The second storage circuit 1046 can also store the information such as data representing incoming sample 114, data representing the individual nail images 218 of FIG. 2, sound files, or a combination thereof. The second storage circuit 1046 can be sized to provide the additional storage capacity to supplement the first storage circuit 1014.

For illustrative purposes, the second storage circuit 1046 is shown as a single element, although it is understood that the second storage circuit 1046 can be a distribution of storage elements. Also, for illustrative purposes, the measurement system 100 is shown with the second storage circuit 1046 as a single hierarchy storage system, although it is understood that the measurement system 100 can include the second storage circuit 1046 in a different configuration. For example, the second storage circuit 1046 can be formed with different storage technologies forming a memory hierarchal system including different levels of caching, main memory, rotating media, or off-line storage.

The second storage circuit 1046 can be a controller of a volatile memory, a nonvolatile memory, an internal memory, an external memory, or a combination thereof. For example, the second storage circuit 1046 can be a controller of a nonvolatile storage such as non-volatile random-access memory (NVRAM), Flash memory, disk storage, or a volatile storage such as static random access memory (SRAM).

The second storage interface 1048 can receive information from the other functional units/circuits or from external sources, or can transmit information to the other functional units/circuits or to external destinations. The external sources and the external destinations refer to sources and destinations external to the second device 106.

The second storage interface 1048 can include different implementations depending on which functional units/circuits or external units/circuits are being interfaced with the second storage circuit 1046. The second storage interface 1048 can be implemented with technologies and techniques similar to the implementation of the second control interface 1044.

The second communication circuit 1036 can enable external communication to and from the second device 106. For example, the second communication circuit 1036 can permit the second device 106 to communicate with the first device 102 over the network 104.

The second communication circuit 1036 can also function as a communication hub allowing the second device 106 to function as part of the network 104 and not limited to be an endpoint or terminal unit or circuit to the network 104. The second communication circuit 1036 can include active and passive components, such as microelectronics or an antenna, for interaction with the network 104.

The second communication circuit 1036 can include a second communication interface 1050. The second communication interface 1050 can be used for communication between the second communication circuit 1036 and other functional units or circuits in the second device 106. The second communication interface 1050 can receive information from the other functional units/circuits or can transmit information to the other functional units or circuits.

The second communication interface 1050 can include different implementations depending on which functional units or circuits are being interfaced with the second communication circuit 1036. The second communication interface 1050 can be implemented with technologies and techniques similar to the implementation of the second control interface 1044.

The second communication circuit 1036 can couple with the network 104 to send information to the first device 102. The first device 102 can receive information in the first communication circuit 1016 from the second device transmission 1010 of the network 104. The measurement system 100 can be executed by the first control circuit 1012, the second control circuit 1034, or a combination thereof. For illustrative purposes, the second device 106 is shown with the partition containing the second user interface 1038, the second storage circuit 1046, the second control circuit 1034, and the second communication circuit 1036, although it is understood that the second device 106 can include a different partition. For example, the second software 1042 can be partitioned differently such that some or all of its function can be in the second control circuit 1034 and the second communication circuit 1036. Also, the second device 106 can include other functional units or circuits not shown in FIG. 10 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function of the detection mechanism 116, a portion therein, or a combination thereof.

For illustrative purposes, the measurement system 100 is described by operation of the first device 102 and the second device 106. It is understood that the first device 102 and the second device 106 can operate any of the modules and functions of the measurement system 100 including a distribution of the functions of the detection mechanism 116.

Figure 11:
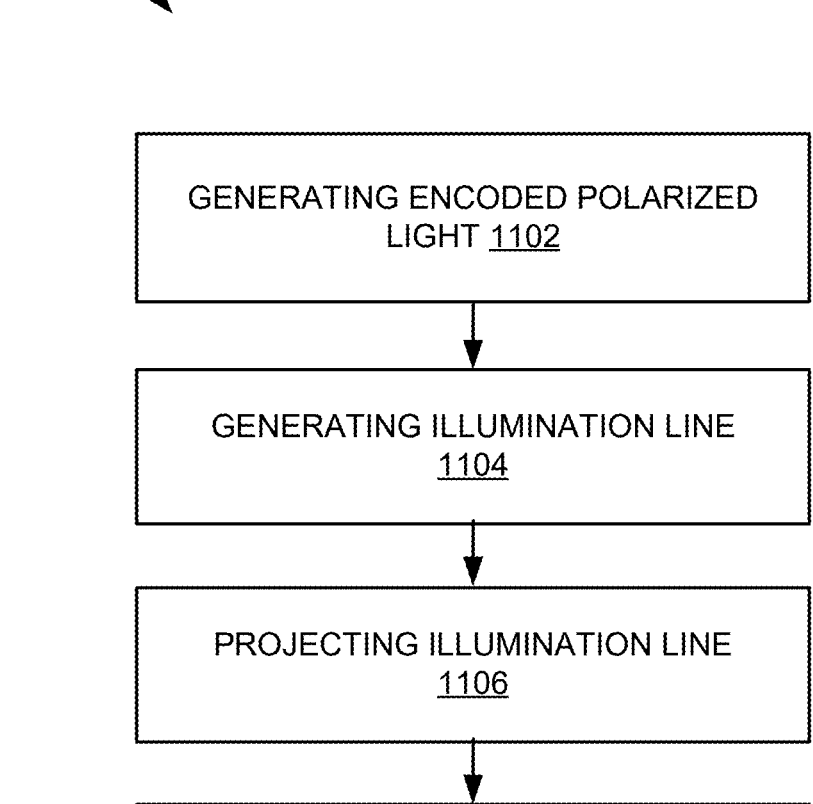
FIG. 11 is a flow chart of a method of operation of a measurement system in an embodiment of the present invention.

Referring now to FIG. 11, therein is shown a flow chart of a method 1100 of operation of a measurement system 100 of FIG. 1 in an embodiment of the present invention. The method 1100 includes: generating an encoded polarized light with a spatially-varying waveplate in a block 1102; generating an illumination line through a telecentric relay tilted under a condition in a block 1104; projecting the illumination line on a sample corresponding to a phase map carrying a different phase delay based on the encoded polarized light in a block 1106; and forming a line image of the illumination line with a linear detector array for testing the sample based on the line image in a block 1108.

One or more embodiments provide image spectroscopic ellipsometry (ISE) that enables two-dimensional (2D) ellipsometric measurement but is slow because a 2D (e.g., Charge-Coupled Device (CCD)) image is needed for each compensator angle. It has been unexpectedly discovered that speed is improved by combining line scan ellipsometry with a spatially-varying waveplate (SVWP) with additional elements, such as 4f relay, to transfer spatial phase and optics (e.g., Scheimpflug) to handle large angle of incidence (AOI).

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a measurement system comprising:
   generating an encoded polarized light with a spatially-varying waveplate;
   generating an illumination line through a telecentric relay tilted under a condition at an angle with a surface of a sample;
   projecting the illumination line on the sample corresponding to a phase map carrying a different phase delay based on the encoded polarized light; and
   forming a line image of the illumination line with a linear detector array for testing the sample based on the line image.

2. The method as claimed in claim 1 wherein generating the illumination line through the telecentric relay tilted under the condition includes reducing an optical aberration of the illumination line with a front lens of the telecentric relay.

3. The method as claimed in claim 1 wherein projecting the illumination line on the sample corresponding to the phase map carrying the different phase delay based on the encoded polarized light includes projecting the illumination line on the sample with a magnification.

4. The method as claimed in claim 1 wherein projecting the illumination line on the sample corresponding to the phase map carrying the different phase delay based on the encoded polarized light includes projecting the illumination line on the sample with a front lens of the telecentric relay tilted relative to the spatially-varying waveplate and the sample for satisfying the condition.

5. The method as claimed in claim 1 wherein generating the encoded polarized light with the spatially-varying waveplate includes generating the phase map with a continuous phase-retardance gradient spanning a range in the spatially-varying waveplate.

6. The method as claimed in claim 1 wherein forming the line image of the illumination line with the linear detector array includes forming the line image of the illumination line by a line-scan sensor with a number of pixels along an axis corresponding to a phase-gradient direction of the illumination line.

7. The method as claimed in claim 1 wherein generating the encoded polarized light with the spatially-varying waveplate includes generating the encoded polarized light with a spatial light modulator or a patterned diffractive optical element.

8. A measurement system comprising:
   a spatially-varying waveplate configured to generate an encoded polarized light;
   a telecentric relay, coupled to the spatially-varying waveplate, tilted under a condition at an angle with a surface of a sample and configured to generate an illumination line and project the illumination line on the sample corresponding to a phase map carrying a different phase delay based on the encoded polarized light; and
   a linear detector array, coupled to the telecentric relay, configured to form a line image of the illumination line for testing the sample based on the line image.

9. The measurement system as claimed in claim 8 wherein the telecentric relay includes a front lens to reduce an optical aberration of the illumination line.

10. The measurement system as claimed in claim 8 wherein the telecentric relay is configured to project the illumination line on the sample with a magnification.

11. The measurement system as claimed in claim 8 wherein the telecentric relay includes a front lens to project the illumination line on the sample with the front lens tilted relative to the spatially-varying waveplate and the sample for satisfying the condition.

12. The measurement system as claimed in claim 8 wherein the spatially-varying waveplate is configured to generate the phase map with a continuous phase-retardance gradient spanning a range.

13. The measurement system as claimed in claim 8 wherein the linear detector array includes a line-scan sensor to form the line image of the illumination line with a number of pixels along an axis corresponding to a phase-gradient direction of the illumination line.

14. The measurement system as claimed in claim 8 wherein the spatially-varying waveplate includes a spatial light modulator or a patterned diffractive optical element to generate the encoded polarized light.

15. A non-transitory computer-readable medium storing an instruction that, when executed by a control circuit of a measurement system, causes the control circuit to perform functions comprising:

generating an encoded polarized light with a spatially-varying waveplate;

generating an illumination line through a telecentric relay tilted under a condition at an angle with a surface of a sample;

projecting the illumination line on the sample corresponding to a phase map carrying a different phase delay based on the encoded polarized light; and forming a line image of the illumination line with a linear detector array for testing the sample based on the line image.

16. The non-transitory computer-readable medium as claimed in claim 15 wherein generating the illumination line through the telecentric relay tilted under the condition includes reducing an optical aberration of the illumination line with a front lens of the telecentric relay.

17. The non-transitory computer-readable medium as claimed in claim 15 wherein projecting the illumination line on the sample corresponding to the phase map carrying the different phase delay based on the encoded polarized light includes projecting the illumination line on the sample with a magnification.

18. The non-transitory computer-readable medium as claimed in claim 15 wherein projecting the illumination line on the sample corresponding to the phase map carrying the different phase delay based on the encoded polarized light includes projecting the illumination line on the sample with a front lens of the telecentric relay tilted relative to the spatially-varying waveplate and the sample for satisfying the condition.

19. The non-transitory computer-readable medium as claimed in claim 15 wherein generating the encoded polarized light with the spatially-varying waveplate includes generating the phase map with a continuous phase-retardance gradient spanning a range in the spatially-varying waveplate.

20. The non-transitory computer-readable medium as claimed in claim 15 wherein forming the line image of the illumination line with the linear detector array includes forming the line image of the illumination line by a line-scan sensor with a number of pixels along an axis corresponding to a phase-gradient direction of the illumination line.

\* \* \* \* \*